United States Patent
Horstmeyer et al.

(10) Patent No.: US 9,054,871 B2
(45) Date of Patent: Jun. 9, 2015

(54) PHYSICAL KEY-PROTECTED ONE TIME PAD

(71) Applicant: California Institute of Technology, Pasadena, CA (US)

(72) Inventors: Roarke Horstmeyer, San Marino, CA (US); Benjamin Judkewitz, Los Angeles, CA (US); Changhuei Yang, Alhambra, CA (US); Ivo M. Vellekoop, Enschede (NL)

(73) Assignees: California Institute of Technology, Pasadena, CA (US); London School of Hygiene & Tropical Medicine, London (GB)

( * ) Notice: Subject to any disclaimer, the term of this patent is extended or adjusted under 35 U.S.C. 154(b) by 155 days.

(21) Appl. No.: 13/773,490

(22) Filed: Feb. 21, 2013

(65) Prior Publication Data

US 2013/0243187 A1 Sep. 19, 2013

Related U.S. Application Data

(60) Provisional application No. 61/601,454, filed on Feb. 21, 2012.

(51) Int. Cl.
  *H04L 29/06* (2006.01)
  *H04L 9/28* (2006.01)
  *H04L 9/06* (2006.01)
  *H04L 9/08* (2006.01)
  (Continued)

(52) U.S. Cl.
  CPC .............. *H04L 9/28* (2013.01); *H04L 27/2278* (2013.01); *H04L 27/3818* (2013.01); *H04L 9/0656* (2013.01); *H04L 9/0841* (2013.01); *H04L 9/0866* (2013.01); *H04L 9/0897* (2013.01)

(58) Field of Classification Search
  CPC .................. H04L 27/2278; H04L 27/3818
  USPC ......................... 380/28; 372/29.014
  See application file for complete search history.

(56) References Cited

U.S. PATENT DOCUMENTS 5,768,381 A * 6/1998 Hawthorne ............... 380/284
2008/0231418 A1    9/2008 Ophey
(Continued)

FOREIGN PATENT DOCUMENTS

WO    WO 2005081934 A2 *  9/2005

OTHER PUBLICATIONS

Vasiliev, M.;et al; "Effect of oblique light incidence on magnetooptical properties of one-dimensional photonic crystals"; Magnetics, IEEE Transactions on vol. 42, Issue: 3;DOI: 10.1109/TMAG.2005.862765 Publication Year: 2006, pp. 382-388.*

(Continued)

*Primary Examiner* — Harunur Rashid
*Assistant Examiner* — Angela Holmes
(74) *Attorney, Agent, or Firm* — Gates & Cooper LLP

(57) ABSTRACT

A device, including one or more Communication Physical Unclonable Function (CPUF) and key storage devices, the CPUF devices each including: a coherent Electromagnetic (EM) radiation source; a spatial light modulator (SLM) connected to the coherent EM radiation source; a volumetric scattering medium connected to the SLM; a detector connected to the volumetric scattering medium; and one or more processors or circuits connected to the detector and one or more processors or circuits connected to the SLM. A communication protocol is also provided.

25 Claims, 19 Drawing Sheets

(51) Int. Cl.
*H04L 27/227* (2006.01)
*H04L 27/38* (2006.01)

(56) References Cited

U.S. PATENT DOCUMENTS

2011/0163088 A1* 7/2011 Besling et al. .............. 219/660
2013/0142329 A1* 6/2013 Bell et al. .................... 380/44

OTHER PUBLICATIONS http://bbs-bildsysteme.com/html/epson.htm.
http://www.theimagingsource.com/en_US/products/oem-cameras/usb-cmos-mono/dmm72buc02ml/.
Vellekoop, I.M., "Controlling the Propogation of Light in Disordered Scattering Media," PhD thesis, Univ. Twente (2008).
Vellekoop, I.M., et al., "Universal Optimal Transmission of Light Through Disordered Materials," Physical Review Letters, PRL 101, 120601 (2008).
Popoff, S., et al., "Measuring the Transmission Matrix in Optics: An Approach to the Study and Control of Light Propagation in Disordered Media," Physical Review Letters, PRL 104, 100601 (2010).
King, Rachael, "EMC's RSA Security Breach May Cost Bank Customers $100 Million", Jun. 8, 2011, http://www.businessweek.com/news/2011-06-08/emc-s-rsa-security-breach-may-cost-bank-customers-100-million.html, as downloaded Sep. 22, 2014.
Zetter, Kim, "Hacker Spies Hit Security Firm RSA", Mar. 17, 2011, http://www.wired.com/threatlevel/2011/03/rsa-hacked/, as downloaded Sep. 22, 2014.
C.E. Shannon, "Communication theory of secrecy systems", Bell System Technical Journal 28(4), 656-715 (1949).
R. Pappu et al., "Physical one-way functions", Science 297,2026-2030 (2002).
B. Gassend et al. "Controlled physical random functions and applications", ACM Transaction on Information and System Security, vol. 10, No. 4, Article 15, (2008).
P. Tuyls et al. "Security with Noisy Data: Private Biometrics, Secure Key Storage and Anit-Counterfeiting", Springer 2007.
B. Skoric et al., "Robust key extraction from physical unclonable functions", Proc. Applied Cryptography and Network Security Conference 2005. Lecture Notes in Computer Science 3531 (Springer-Verlag, New-York, 2005).
R. Pappu, "Physical One-Way Functions", Ph.D. dissertation, Massachusetts Institute of Technology (2001).
H. Zhou et al., "Linear extractors for extracting randomness from noisy sources", Proc. IEEE Int. Symposium Info. Theory, 1664-1668, (2011).
B. Skoric, "On the entropy of keys derived from laser speckle; statistical properties of Gabor-transformed speckle", J. Opt. A: Pure Appl. Opt 10, (2008).
Y. Dodis et al. "Fuzzy extractors: How to generate strong keys from biometrics and other noisy data", Proc. EUROCRYPT 2004 LNCS 3027, 523-540 (2004).

* cited by examiner

PHYSICAL KEY-PROTECTED ONE TIME PAD

CROSS-REFERENCE TO RELATED APPLICATIONS

This application claims the benefit under 35 U.S.C. Section 119(e) of the following co-pending and commonly-assigned U.S. provisional patent application, which is incorporated by reference herein:

Provisional Application Ser. No. 61/601,454, filed on Feb. 21, 2012, by Roarke Horstmeyer, Benjamin Judkewitz, Changhuei Yang, and Ivo M. Vellekoop, entitled "PHYSICAL KEY-PROTECTED ONE TIME PAD."

STATEMENT REGARDING FEDERALLY SPONSORED RESEARCH AND DEVELOPMENT

This invention was made with government support under Grant No. OD007307 awarded by the National Institutes of Health. The government has certain rights in the invention.

BACKGROUND OF THE INVENTION

1. Field of the Invention

This invention relates to a method and device for secure communication.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

The one-time-pad (OTP) is an often-cited example of a perfectly secure encryption standard for two-party communication. Any information contained in a binary message can be completely removed by performing an exclusive- or operation between the message and a unique random binary sequence of equal length. Decryption of this encoded message is impossible without access to the original random sequence (i.e., the symmetric key). Thus, if both parties can meet to establish a shared list of uniquely random sequences before any long-distance communication, the OTP proves unbreakable by passive attackers [1].

Since both parties must store a random key that is at least as long as the combined length of their shared messages, the OTP has often been viewed as somewhat impractical.

Continuing advances in solid-state memory storage (~Tb/$mm^3$) and efficient random number generation (10-100 Gb/s) [2], however, are beginning to offer increasingly practical options for OTP use in situations where security is paramount.

This security can only be guaranteed if the shared symmetric key is kept completely secret from any adversary. Several recent software-based attacks have revealed the inherent insecurity of storing keys digitally, even for jointly digital and physical-based devices [3,4]. These forms of attack can easily uncover, replicate, and distribute secret keys or their associated algorithms, often without the knowledge of their users.

A more secure alternative to the digital storage of OTP keys is to use a physical unclonable function (PUF) [5]. PUF's take the form of a disordered system that contains all desired randomness within its physical structure. This physical randomness can be probed with an input, or challenge, and it will output a response that depends on the microscopic three-dimensional distribution of disordered particles. Due to the large space of possible micro-scale interactions, an ideal PUF can produce a large number of mutually random responses from a large set of challenges that vary little.

PUF's have been investigated for authentication, identification, and key establishment, among other uses [7-9]. However, their use as a storage device for an OTP symmetric key has not been explored. One or more embodiments of the present invention propose both an optical setup (Section I) and a general encryption protocol (Section II) to use volumetric scattering PUF's for secure OTP communication. A main difference between the proposed optical PUF setup and previous setups is the introduction of digital control over the input optical field via an SLM inserted directly in the incident beam's optical path. Another design, not for communication and using a different optical arrangement, is included in a patent application by Ophey et al. [14]. Unlike the Ophey patent application [14], one or more embodiments of the current invention using digital control enables two or more devices to establish a list of secret key pairs for future communication, even though each device contains a scattering element with a mutually random microstructure. Given the ability for two communicating parties to meet beforehand, this OTP-PUF combination sets the bar very high for most forms of possible attack.

SUMMARY OF THE INVENTION

One or more embodiments of the present invention disclose a device, comprising one or more Communication Physical Unclonable Function (CPUF) and key storage devices, the CPUF devices each comprising: a coherent Electromagnetic (EM) radiation source; a spatial light modulator (SLM) connected to the coherent EM radiation source; a volumetric scattering medium connected to the SLM; a detector connected to the volumetric scattering medium; and one or more processors or circuits connected to the detector and one or more processors or circuits connected to the SLM.

The SLM can comprise comprises pixels and be positioned to receive, on the pixels, coherent Electromagnetic (EM) radiation from the coherent EM radiation source. Upon receipt of the coherent EM radiation, the pixels can shape or modify a first phase and/or first amplitude of the coherent EM radiation according to one or more patterns or a sequence of patterns, to form and transmit patterned EM having a patterned phase and patterned amplitude. The volumetric scattering medium can be positioned to receive and scatter the patterned EM radiation into keyed EM radiation. Upon receipt of the patterned EM radiation, the volumetric scattering medium can shape or modify the patterned phase and the patterned amplitude of the patterned EM radiation into keyed phase and a keyed amplitude of keyed EM radiation. The detector can be positioned to detect an output speckle of the keyed EM radiation and comprise a circuit that produces a digital signal in response to the keyed EM radiation. The processors or circuits can randomize the digital signal to transform the output speckle into a digital key used to encrypt a message.

The processors or circuits connected to the SLM can generate, control, and input the patterns or sequence of patterns on the SLM to obtain one or more keys. Each of the SLM's pixels can represent a one or a zero of the pattern, wherein the pattern is random half ones and half zeros.

The processors connected to the detector can include one or more error correction processors or error correction circuits that perform error correction of the key stored in the CPUF.

The processors or circuits connected to the detector perform a whitening algorithm, comprising transforming data, detected by the detector, into a column vector; and multiplying the column vector with a rectangular binary sparse random matrix, thereby producing a whitened key. The whitening algorithm, the SLM's pixels, and stability of the CPUF device, can be such that the CPUF device generates, stores, and extracts a key with more than 10000 random bits.

The SLM, the scattering medium, and the detector can be in a package or integrated circuit, and connected with stability such that a communication key stored in the CPUF device is at least 50% reproducible, or at least 50% of bits in the key are the same, at least 24 hours after formation of the key in the CPUF device.

The scattering medium can be attached to the detector via a first refractive medium; the SLM can be physically attached to the scattering medium and sensor via a second refractive medium; and all control electronics for the CPUF device can be embedded within the scattering material.

A refractive medium and distance between the SLM and the detector can be such that an overlap between the SLM's pixels and the detector's pixels is maximized.

The device can further comprise a refractive medium that produces a tailored focus of the patterned EM radiation on the scattering medium.

A distance between the volumetric scattering medium and the detector can match a speckle size of the scattered or keyed EM radiation with the detector's pixels.

The scattering medium can comprise a material that does not decorrelate over time or is stable over at least 24 hours. The scattering medium can be an opal coated scatterer, for example.

The device can further comprise an apodizing or aperture mask on the volumetric scattering medium.

One or more embodiments of the invention further disclose a device for securely communicating between a first party (Alice) and a second party (Bob), further comprising: a first one of the PUF devices; a second one of the PUF devices; and computers including a first computer and a second computer.

The PUF devices and the computers can perform one or more of the following functions:

(1) producing one or more first keys, in the first PUF device at a first location, in response to the one or more patterns;
(2) producing one or more second keys, in the second PUF device at the first location, in response to the one or more patterns,
(3) producing or generating in one or more of the computers at the first location, a plurality of functions wherein each function is a function of one of the first keys and one of the second keys;
(4) storing in one or more databases on one or more of the computers, the patterns, the functions, and an association between the functions and the patterns;
(3) re-creating or re-producing one of the first keys, in the first PUF device at a second location, using one of the patterns;
(4) encrypting, in the first computer at the second location, the message with the recreated or reproduced first key;
(5) sending or transmitting, from the first computer at the second location, the encrypted message and the one of the patterns;
(6) receiving, in the second computer at a third location, the encrypted message and the one of the patterns;
(7) re-creating or re-producing in the second PUF device at the third location, one of the second keys using the one of the patterns, to form a recreated or reproduced second key;
(8) obtaining, from the databases, the function corresponding to the one of the patterns;
(9) operating, in the second computer at the third location, on the encrypted message using the recreated or reproduced second key and the function, thereby decrypting the message; and wherein the first location is a physical location or locations where Alice and Bob have met or established a secure connection, and the second location and the third location are physical locations of Alice and Bob, respectively, at a later time and after Alice and Bob have separated.

The function can be an XOR operation between the first key and the second key; the encryption can be an XOR operation between the message M expressed in binary and the binarized first key $b_i$, producing the encrypted message $M \oplus b_i$; and the operating can be a double XOR procedure of the encrypted message $(b_i \oplus M) \oplus (b_i \oplus a_i) \oplus a_i = M$, wherein $a_i$ is the reproduced second key and such that an output of the XOR process is the original message M.

The first computer can concatenate a plurality of the first keys to encrypt a message that is longer than each of the first keys.

One or more embodiments of the invention further disclose a device or apparatus for communicating between a first party (Alice) and a second party (Bob), further comprising (a) a first one of the CPUF devices that creates, stores, and recreates or reproduces one or more first keys upon receipt of one or more first patterns; (b) a second one of the CPUF devices that creates, stores, and recreates or reproduces one or more second keys upon receipt of one or more second patterns; and (c) one or more computers that: (i) encrypt a message using one of the recreated or reproduced keys, wherein the recreated or reproduced key has 0% error as compared to the created key; and (ii) use a public key protocol to establish a secure connection between the CPUFs and transmit or receive the encrypted message.

One or more embodiments of the invention further disclose a method of fabricating one or more Communication Physical Unclonable Function (PUF) devices and a method or protocol for securely communicating.

BRIEF DESCRIPTION OF THE DRAWINGS

Referring now to the drawings in which like reference numbers represent corresponding parts throughout:

FIG. 1 b) illustrates an example binary amplitude pattern displayed on the SLM that produces a random speckle image on the Complementary Metal-Oxide Semiconductor (CMOS) sensor, according to one or more embodiments of the invention, wherein, if the SLM pattern is perturbed slightly, the corresponding image will change considerably due to the highly random nature of the intermediate medium.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

I. Using an SLM to Control Speckle Patterns

FIG. 1(a) illustrates a basic embodiment of the proposed physical encryption setup consisting or comprising of four components: a coherent light source 100, a spatial light modulator (SLM), a scattering medium 102, and a digital detector 104 (e.g., CMOS sensor).

Figure 1:
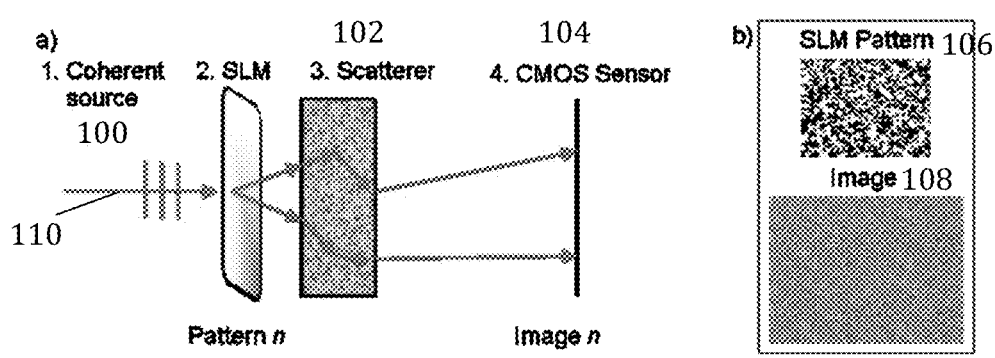
FIG. 1 a) is a simple diagram of the proposed optical setup according to one or more embodiments of the invention.

FIG. 1 (b) illustrates an example binary amplitude pattern 106 displayed on the SLM that produces a random speckle image 108 on the CMOS sensor.

The following analysis of FIG. 1 considers a laser-based source and a liquid-crystal-based transmissive SLM, although similar setups using e.g. a reflective SLM could yield similar results. Light 110 from the source is directed through the SLM, which varies the spatial distribution of amplitude and/or phase of the coherent wavefront. The light with controlled amplitude and phase then passes through the volumetric scatterer and interferes to produce a randomized speckle intensity pattern at the detector. Small changes in the amplitude and phase of the wavefront incident on the scattering medium yield large, random (i.e., independent) variations in the output speckle intensity.

The following description examines the number and size of all possible pseudorandom keys that this optical setup can generate. The product of the number of independent keys with the number of useful random bits in each key indicates the total number of random bits available for encrypted communication. Section II explains in further detail how these random bits can be used to establish a shared secret between two OTF-PUF's.

1. Estimated Number of OTP-PUF Keys

As noted above, the space of unique incident wavefronts comprise our set PUF challenges, while their corresponding speckle intensity outputs are the PUF response. The space of all challenge-response pairs is very large, with correlations between challenges and responses minimized assuming a thick, highly scattering volumetric medium. The number of independent, reproducible challenge-response pairs represents the number of useful symmetric keys that our OTP-PUF can generate. The term "independent" here implies that no sets of challenges and responses can lead to a prediction of any other set (i.e., their mutual information is zero) [10]. The term reproducible implies that a given challenge can always re-create its response. As explained in the next subsection, the introduction of noise to the system reduces the number of reproducible bits in the speckle pattern response, and thus reduces the number of useful bits per key.

Pappu et al. [5] offers a rough experimental-based estimate of the number of independent keys obtainable from a volumetric scatterer with a 100 $mm^2$ surface probed by a 10 $mm^2$ beam at $10^{11}$ different speckle patterns. Their analysis assumes control over the challenge wavefront's incident angle at $10^9$ discrete positions in two dimensions, and acknowledges the possibility of statistical coupling between modes. Likewise, Skoric et al. [10] place a lower bound on the number of independent keys, from an information-theoretic perspective, at roughly $10^6$ keys for a 100 $mm^2$ surface. However, this lower bound may be excessive, since it assumes all information from the scattering medium can be extracted with $10^6$ unidentified challenge fields. In practice, identifying these fields will require many additional measurements, significantly increasing the practical complexity of the volumetric scatterer.

Since the proposed OTP-PUF device according to one or more embodiments offers discrete control of the amplitude and/or phase of the light's wavefront, at N spatial locations with an SLM (N is the SLM's resolution), it offers many more degrees of freedom than just angular variation of the incident light's angle. Assuming, for simplicity, that an 8-bit phase SLM is placed directly before the front face of the scattering medium, the incoming wavefront can then assume $2^8$N! unique spatial distributions, assuming control over either amplitude or phase. For a conventional 1-megapixel SLM, this number is astronomically large.

Each of these unique input wavefronts will certainly not lead to a completely independent speckle field. This becomes clear by first considering the complex field at the sensor plane instead of the intensity. A random complex scattering matrix T can represent the transformation of an initial field $E_o$ generated by the SLM into a field at the detector $E_f$ [15]:

$$|E_f\rangle = T|E_o\rangle = \sum_o^N t_{fo}|E\rangle \quad (1)$$

where bra-ket notation is used to denote vectors. Independent fields at the output plane will lead to an inner product equal to 0, directly yielding, $$0 = \langle E_f|E_f\rangle = \langle E_o|T^*T|E_o\rangle \approx \langle E_o| \quad (2)$$

The approximation assumes the transmission matrix T is large and highly random, causing its channels to be, on average, uncorrelated. Here it is clear that the length of vector $E_o$ defines the number of orthogonal inner products, and thus the number of independent output fields. In other words, the total number of independent keys simply reduces to the number of SLM degrees of freedom. With the 8-bit, 1-megapixel device, this yields $2.5 \times 10^8$ independent fields.

Since the detector measures intensity instead of complex field, the relationship between input and output degrees of freedom becomes nonlinear (i.e., Eq. (2) is not valid). This nonlinearity will extend the space of available random functions, but correlations will certainly persist [11]. While a full analysis is beyond this section's scope, it is reasonable to assume that with control over roughly the same number of degrees of freedom via an SLM as in [5], coupled with a non-linear output response to linear combinations of SLM patterns, will lead to a larger key space than found in [5]. Thus, $10^{11}$ keys is a rough a lower-bound estimate.

2. Estimated Size of OTF-PUF Keys

The average number of noise-free, uncorrelated bits that can be extracted from a speckle pattern determines the size of each symmetric key. Under idealistic assumptions of zero noise and a perfect match between sensor pixel size and the correlation length of the measured speckle field, the number of bits k in each key is simply given by the number of pixels M times the number of measurable bits per pixel $b_p$:

$$\langle k_{ideal}\rangle = Mb_p \quad (3)$$

For example, an 8-bit, 1-megapixel sensor will ideally yield $2^8 10^6$ random bits per key. In practice, the assumption of zero noise and matched speckle size are rarely met, and lead to a tradeoff space in both the optical design and required digital post-processing. Unavoidable noise sources include mechanical movement, thermal fluctuations, laser instability, and thermal and shot noise of the incident light. Increasing the detected speckle size reduces the detected noise at the expense of introducing statistical coupling between neighboring pixels. A field with speckles that extend over w pixels on average reduces the number of useful random bits by a factor of w:

$$\langle k\rangle = Mb_p/\langle w\rangle \quad (4)$$

Figure 2:
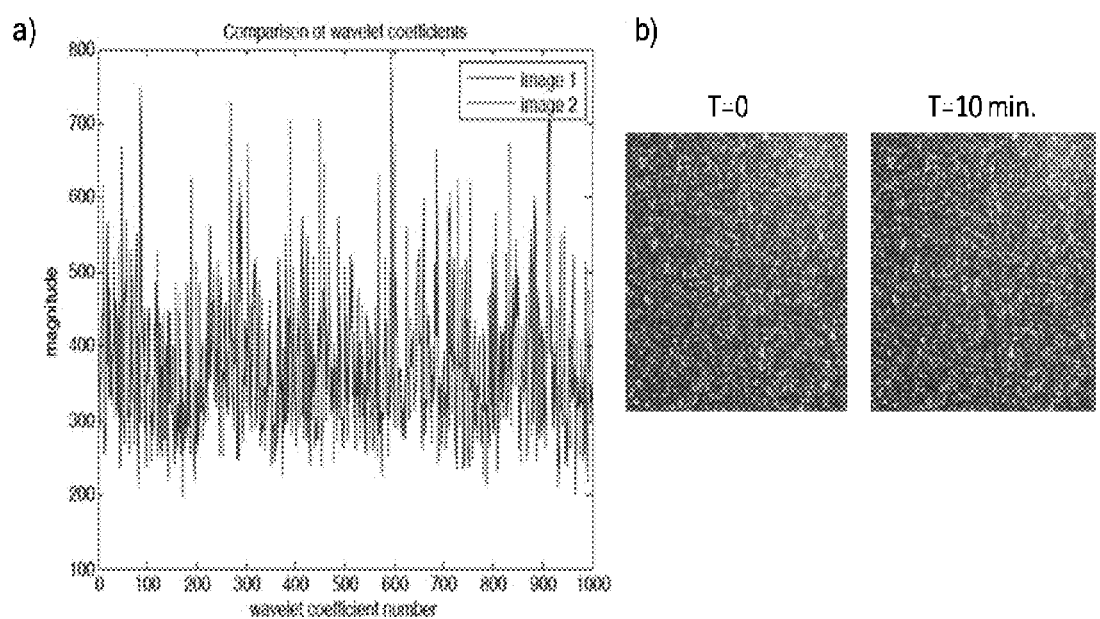
FIG. 2 illustrates an example of using a wavelet decomposition of two recorded speckle images to reduce detected noise, according to one or more embodiments of the invention, wherein in a) the first 1000 wavelet coefficients of 2 speckle images of the same input field are shown and in b) the associated raw images are shown.

Digitally post-processing detected images helps identify correlated and noisy pixels, especially when multiple output measurements are performed for the same input. A wavelet decomposition can be used as in [5] to identify components of the speckle pattern that are invariant to movement and intensity fluctuations (see FIG. 2). More advanced processing can be performed when multiple images are captured. FIG. 2(a) plots a comparison of wavelet coefficients, plotting magnitude vs. wavelet coefficient number. FIG. 2(b) plots the raw images at T=0 and T=10 minutes (min).

Experimentally, the present invention has found that enlarging speckle fields over ~5 pixels per dimension leads to a more noise-invariant intensity pattern, reducing the number of useful bits to roughly $2^8 M/25$ per key. Digitally removing noisy pixels can further reduce this value by possibly an order of magnitude. Thus, a safe lower bound on the number of useful bits per key is roughly 5000, assuming worst-case-scenario binary control over a 1 Megapixel (MP) sensor and SLM.

3. Guaranteeing Random Bit Generation

Further reduction in key size may be required to meet strict randomness requirements. The size of this reduction is setup-dependent, and can be determined through well-known algorithmic tests (e.g., NIST's SP800-22, [12] or the Dieharder suite [13]). Additional reasons for key size reduction include the distribution of bit values not being uniform from over/under exposure, or sequential pixels or wavelet coefficients not exhibiting sufficient variation. Experiments indicate this additional reduction is on the order of one magnitude.

Combining results from subsections 1.1, 1.2 and 1.3, the total number of useful random bits has an estimated lower bound of approximately $\langle k\rangle = 5 \times 10^{13}$, which could enable multiple terabytes of communication.

4. Requirements of the Optical Setup in One or More Embodiments

Figure 3:
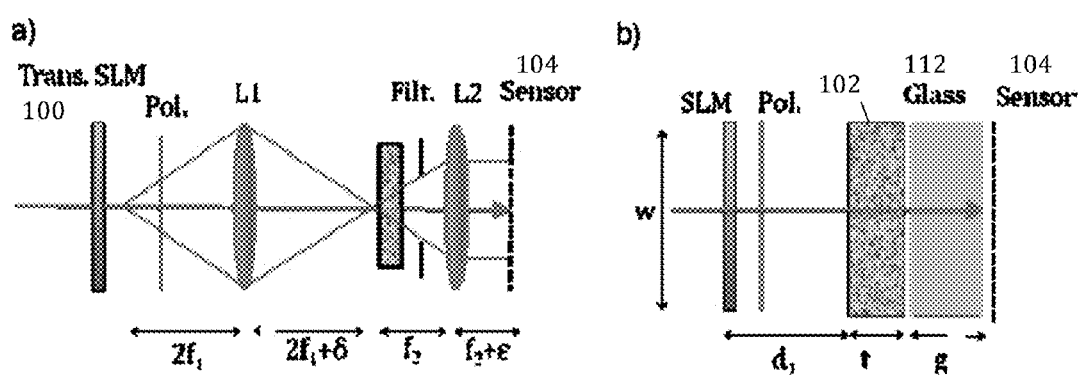
FIG. 3 a) and b) illustrate two possible optical setups for the OTP-PUF, both using a transmissive SLM to control the wavefront incident on the scattering medium, according to one or more embodiments of the invention.

As is clear from the above analysis, a successfully designed OTP-PUF device will maximize the key space-size product $\langle k\rangle$. Clearly, increasing the resolution of the SLM and detector will increase $\langle k\rangle$. Current SLM's and detectors offer the ability to address $10^6$-$10^7$ pixels. An optical design should be chosen to minimize the speckle size while making sure it is larger than the size of 1 detector pixel (typically 2-10 μm wide). Additionally, the SLM should be arranged such that variation of its pixels will result in wavefront variation that is not localized to a particular region of the scattering volume. FIG. 3 a) offers an example optical setup that achieves both of these goals. The polarizer (Pol) allows for selection of amplitude or phase modulation generated by the SLM. In FIG. 3 a), the addition of two lenses, L1 and L2, offer control over the size of the generated speckle. Lens $L_1$ in the figure is arranged such that the scatterer is near the Fourier plane of the SLM, spreading the effect of one SLM pixel across as much of the scatterer as possible. Lens $L_2$ can be used to vary the size of the speckle mapped to the sensor plane. Typical values for the above parameters in an experimental setup are focal distance $f_1$=15 mm for L1, δ=1 mm, focal length $f_2$=50 mm of lens L2.

While the optical design in FIG. 3(a) allows for maximal control over system parameters, it is susceptible to various sources of noise (e.g., thermal fluctuations and small movements, which dominate as a source of error).

The optical design in FIG. 3(b) removes these sources of noise, offering a potentially more practical setup by fixing the scattering medium to the sensor so the two cannot move in relation to one another. Specifically, FIG. 3 b) illustrates a more compact and noise-resistant design is achieved when the scattering medium 102 is physically attached to the sensor above a substrate of glass or other transparent or refractive medium 112. Typical parameter values here are $d_1$=50 mm, t=1 mm, g=10 mm. The thickness of the glass layer should be chosen to assure speckles incident on the sensor are at least as large as a single pixel. An even more secure design would also fix the SLM to the scattering medium and sensor with an additional layer of glass with thickness $d_1$.

Finally, the volumetric scattering material should exhibit a highly randomized microstructure with a minimized average scattering length. However, to both reduce noise and minimize registration time between two OTP-PUF users (Section II), the scatterer should absorb as little light as possible. Good candidates include small air cavities infused in glass, multiple layers of paint sandwiched between glass layers, or microbeads fixed into an arrangement that is resistant to any movement. Reflective surfaces could also be added in to multiple-layer materials to increase the scattering's randomness.

II. A Protocol to Securely Share Asymmetric Keys

Often, when two parties are able to physically meet to establish a secure communication channel, for practical simplicity they decide on using the same key for communication. One OTP is shared between each communicator and is used to both encrypt and decrypt the same message. This key is often copied and shared easily in digital form. If the OTP is truly random and its bits are never used more than once for encryption, then a secure communication channel is guaranteed. However, as noted earlier, the security of the system may be compromised by an active attack on the digital storage of the OTP key on either end.

The OTP-PUF setup overcomes this insecurity by replacing digital storage of random sequences with physical storage in a disordered medium. This random structure, which defines how useful the OTF-PUF is, also prevents it from being copied. Thus, the conventional symmetric key protocol of an OTP cannot be used. In other words, since it is impossible for any two users to simultaneously hold two identical volumetric scatterers, they cannot rely on a symmetric key encryption setup. Instead, one or more embodiments of the present invention propose an asymmetric key sharing protocol that allows owners of two unique OTP-PUF's to establish secure communication channels, given their ability to meet beforehand.

Figure 4:
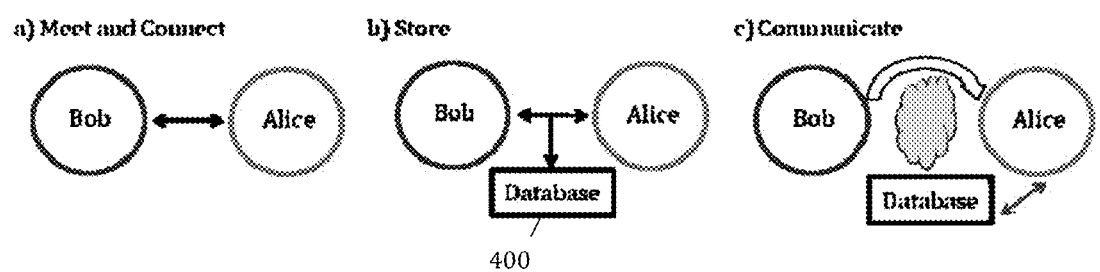
FIG. 4 is a simple schematic of the proposed communication protocol for Bob and Alice's OTP-PUF's, according to one or more embodiments of the invention.

FIG. 4 $a$)-$c$) illustrate the conceptual steps of the asymmetric key protocol, according to one or more embodiments of the invention. Bob and Alice are used to label the two parties, who each have their own OTP-PUF device. Before requiring encrypted communication, Bob and Alice must meet and connect their two devices, which will generate many associated public-private key pairs (FIG. 4 $a$)). They will store a combination of these key pairs in a public database (FIG. 4 $b$)). After Bob and Alice separate, Bob can send/communicate an encrypted message to Alice by selecting a public-private key pair with his OTF-PUF device, and then mixing the message with the private key. Alice can decrypt the message with her associated private key in tandem with the mixed public-private key selected from the public database 400 (FIG. 4 $c$)).

A. Simple Communication Protocol

Figure 5:
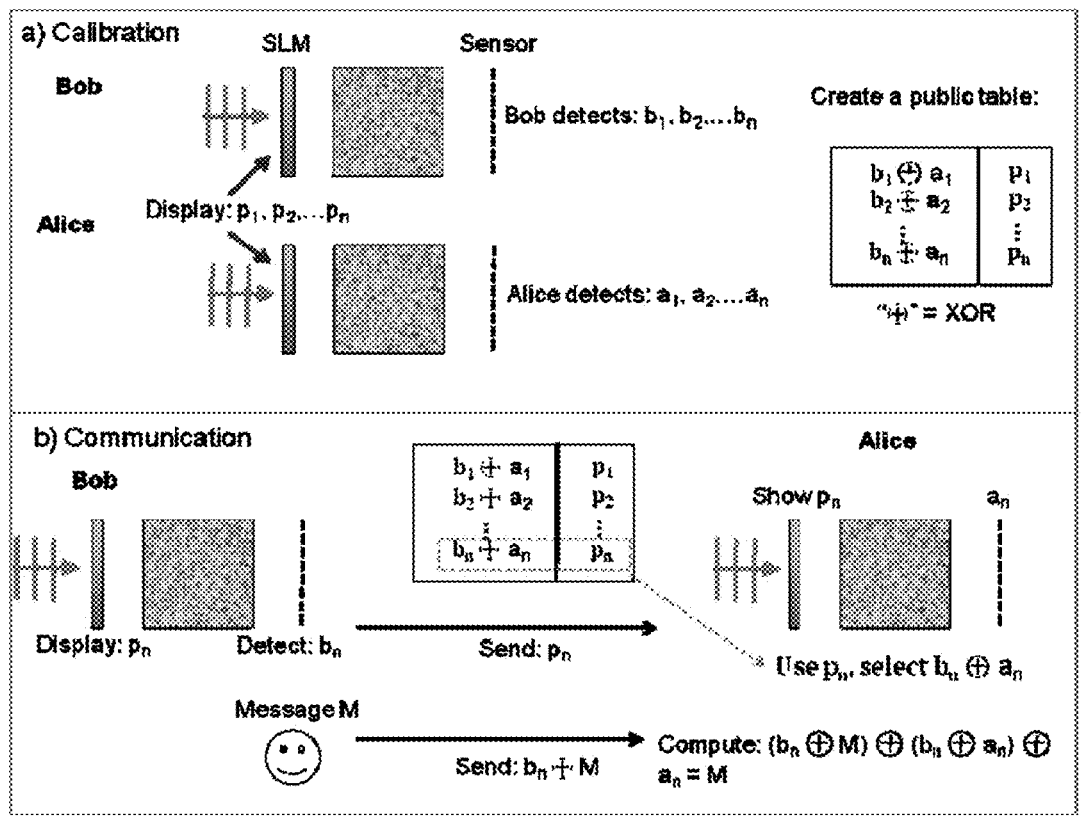
FIG. 5 is a simplified diagram of the proposed OTP-PUF communication protocol, according to one or more embodiments of the invention, wherein in (a) calibration steps for when Bob and Alice meet to setup encryption/decryption key pairs using a public table are illustrated and in (b) the communication protocol for Bob and Alice to use to share a message M is shown.

FIG. 5 illustrates a detailed step-by-step list of the communication process, according to one or more embodiments of the invention. As long as an eavesdropper never has access to either physical PUF device, the proposed protocol is resilient against many forms of attack, including man-in-the-middle, related-key and to some extent known-plaintext and chosen-plaintext attacks, since keys are never repeated. Furthermore, as analyzed in [5] and [10], the physical duplication of PUF devices is extremely difficult, and probing their structure to create a model is time-consuming. Thus, given devices that generate completely independent keys with verified random bits, the only realistic attack mechanism appears to be direct theft of the device.

OTP-PUF Steps of Operation

1. Calibration: Bob and Alice Meet (FIG. 5($a$))

a. Bob holds an OTF-PUF device containing volumetric scatterer B, Alice holds an OTF-PUF device containing volumetric scatterer A.

b. Bob and Alice connect their OTF-PUF devices to a shared signal source, most simply to a common computer, although embedding a microcontroller in each device itself and simply connecting the two microcontrollers is another possible implementation.

c. Either through a common computer or connected microcontrollers, a set of patterns $p_1, p_2, \ldots p_n$ is selected to display on both Bob and Alice's SLM. These patterns typically take the form of a pseudorandom matrix of real or complex values for amplitude or phase modulation, respectively. The randomness of the patterns should be selected to meet the independent requirements discussed in Section I. n will define the size of the shared key space between Bob and Alice.

d. With each device's light source on, Bob and Alice sequentially display $p_1, p_2, \ldots p_i \ldots p_n$ on their respective device's SLM. They record the output speckle intensity patterns $b_1, b_2 \ldots b_i \ldots b_n$ and $a_1, a_2 \ldots a_i \ldots a_n$ on their respective detectors, generated from light scattering through the intermediate medium. Since Bob's scattering medium (B) differs from Alice's (A), their recorded intensities $b_i$ and $a_i$ for a given screen pattern $p_i$ will likewise be different and uncorrelated.

e. Either through the same connection as in b. to a shared computer, or through another connection (wired or wireless), Bob and Alice's devices will sequentially store, in the $i^{th}$ row of a table, the displayed pattern $p_i$. They will also store in the $i^{th}$ row the XOR'd value of their detected intensities expressed in binary form (i.e., the binarized digital value from the $(x,y)^{th}$ pixel on Bob's detector is XOR'd with the matching detected value on the $(x,y)^{th}$ pixel on Alice's detector), $b_i \oplus a_i$.

f. After displaying n patterns and each recording and storing $b_i \oplus a_i$ for n images in a database, the database is made public (i.e., accessible through some means of public communication). It is important to note that the detected intensities $b_1, b_2 \ldots b_n$ and $a_1, a_2 \ldots a_n$ should not be recorded or stored. Since these represent Bob and Alice's private keys, so to speak, any reference to their values should be erased, except for the XOR'd value $b_i \oplus a_i$ shared between the two in the public database.

2. Communication: Bob and Alice Separate (FIG. 5($b$))

a. Once separated, Bob and Alice can use their OTP-PUF devices and the stored values in the database to securely encrypt and decrypt messages. We will assume Bob has a message M that he wishes to encrypt and send to Alice, and for simplicity that M contains the same number or fewer bits than the key length. Extending this analysis to include longer messages is straightforward.

b. Bob selects an arbitrary pattern, $p_i$, from the public database. Any pattern that has not been previously used for communication may be selected. This selection process can easily be automated.

c. The pattern $p_i$ is displayed on Bob's SLM as a challenge, and its associated speckle intensity pattern $b_i$ is recorded on Bob's detector. In the absence of any noise, this recorded pattern should exactly match the image $b_i$ recorded during the calibration step. In practice, steps outlined in Section I can be used to reduce noise, and the effective size of the private key will be reduced.

d. Bob's OTP-PUF device performs an XOR operation between the message M expressed in binary and the binarized speckle intensity pattern $b_i$. The encrypted message $M \oplus b_i$, with all information removed due to the randomized nature of $b_i$, is sent to Alice. Bob also sends Alice the pattern $p_i$ that he displayed on his OTP-PUF.

e. Alice receives $M \oplus b_i$ and $p_i$, ideally without any noise introduced by the communication channel. Alice first uses the pattern $p_i$ to find, in the public table, the corresponding entry in the $i^{th}$ row, $b_i \oplus a_i$, that was stored during calibration. Alice's OTP-PUF saves this value from the table.

f. Alice's OTP-PUF then displays $p_i$ on its SLM and its sensor records the generated speckle intensity pattern $a_i$. Again assuming an ideal case without noise, this $a_i$ will be the same $a_i$ that was generated by Alice's OTP-PUF by showing the SLM pattern $p_i$ during the calibration step. Steps from Section I can again be used to reduce or remove noise in a practical scenario.

g. Alice then uses the two values from e and f to decrypt the message M. Specifically, she performs a double XOR procedure of the encrypted message received from Bob:

$$(b_i \oplus M) \oplus (b_i \oplus a_i) \oplus a_i = M$$

The output of this XOR process will be the original message M, which only Alice will be able to see given her ability to determine a, with her OTP-PUF.

Many alternative but related procedures can be implemented besides those outlined above. For example, security from potential brute-force attack might be increased if Bob and Alice choose not to publish their display patterns publically, and instead share these patterns privately. Or, keys generated by Bob and Alice's OTP-PUF's can be used not to directly encrypt/decrypt messages, but instead to establish a shared key pair between the two. This key pair could be used in a public key protocol (e.g., RSA) to enable a much larger amount of data transfer, albeit with reduced security.

III. Example

1. Experimental Setup

The example CPUF device uses a solid-state 532 nm CW laser (Spectra-Physics, Excelsior Scientific 200 mW) that is spatially filtered and collimated to illuminate a transmissive SLM (1920×1080 pixel, 1×1.6 cm Epson HDTV LCD, BBS Bildsysteme). The SLM is operated in phase-transmissive mode (without a second polarizer). A microscope objective immediately after the SLM focuses the wavefront onto CPUF's volumetric scatterer front surface. The scatterer-detector CPUF segment is composed of four main components that are fastened together using an epoxy to minimize any movement with respect to one another. The base of the CPUF is a 2.2 μm, 2592×1944 CMOS pixel array (The Imaging Source, Micron CMOS MT9P031) with USB readout to a desktop computer. Second, a glass light guide (1.24 cm Quartz disk, Mcmaster-Carr 1357T62) is fixed to the surface of the CMOS protective glass. Third, a custom-printed amplitude-modulating mask (Kodak LVT-exposed on film at 2032 dpi, Bowhaus Printing, 5 mm×5 mm) is attached to the glass light guide to serve as the speckle-shaping aperture. The aperture size is designed to be approximately 1 mm across, ensuring the average speckle size extends across 5 sensor pixels, leading to enhanced speckle image stability over time. As explained in Section IV.D, the apodizing mask follows a 2D-separable Cauchy distribution to ensure the speckle exhibits the required properties of a Markov random process at the sensor. 99% of the mask's light transmission is contained within its central 1.2 mm² area. Fourth, the volumetric scattering material is fixed above the aperture mask. Several scattering materials were tested, including combinations of Zinc Oxide, opal diffusing glass (Edmund Optics NT46-645), ground glass (120-grit, Edmund Optics NT83-379) and spray paint. The results presented in this section used the opal diffusing glass with a scattering area thickness of approximately 0.5 mm, determined through the experiment described in Section IV.A.

2. Operation

Figure 6:
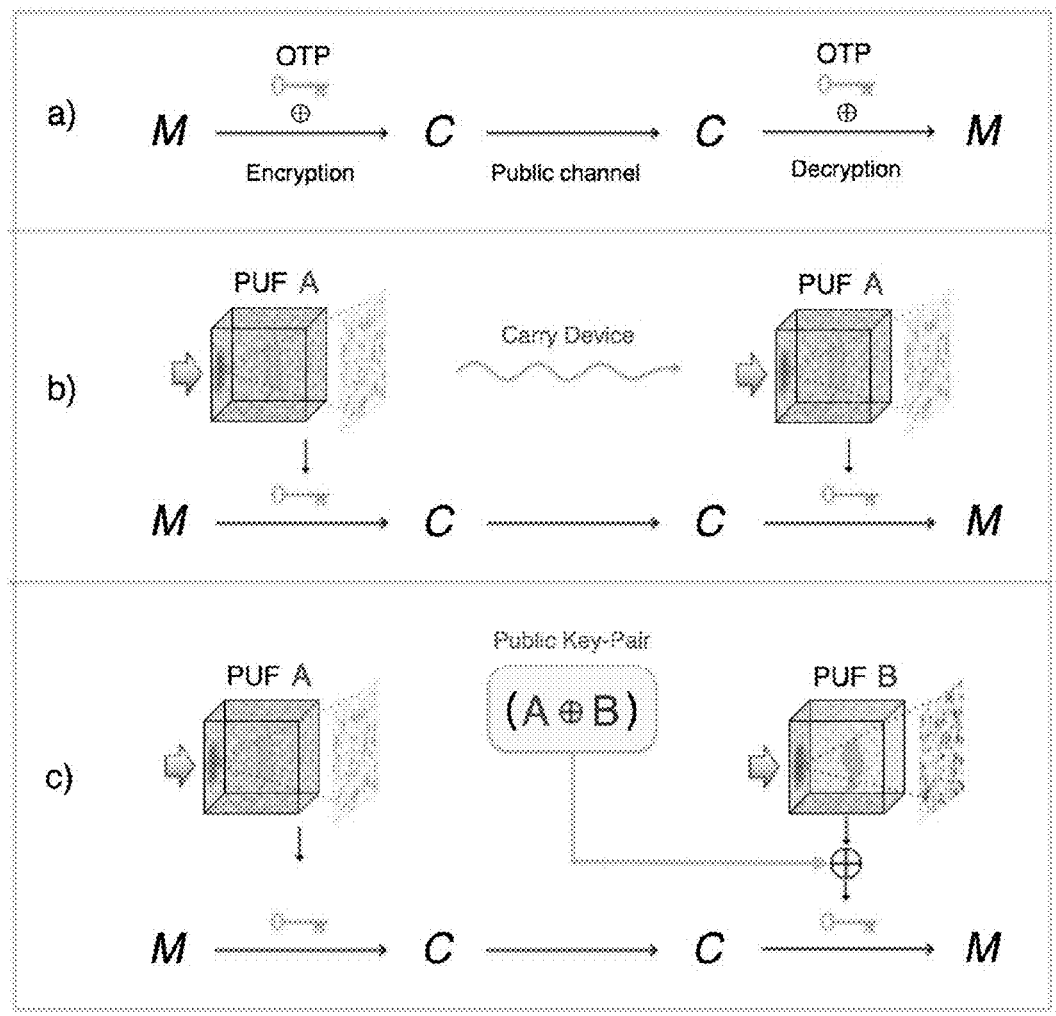
FIG. 6 illustrates the one-time-pad (OTP) protocol using unclonable keys, according to one or more embodiments of the invention.

FIG. 6 briefly outlines the CPUF system's communication pipeline and desired security requirements, according to one example.

FIG. 6 (a) illustrates the traditional OTP. The XOR of a binary message M with an equal length digital key K creates an encrypted ciphertext C. If K is perfectly random, it is impossible to determine M from observing C over a public channel [1]. To decrypt, only an XOR with the same key K will reveal the original message.

FIG. 6(b) illustrates a major security flaw of many communication protocols, including the OTP, is the direct ability to copy and share the digital key K. This flaw may be addressed by storing the key within a volumetric scatterer's random structure (PUF A). Keys can be accessed with specifically shaped optical probes. If the volumetric scatterer's structure is truly unique and unclonable, then physical transportation appears to be the only possible method of sharing keys between two parties, which is impractical.

FIG. 6 (c) illustrates a physically secure OTP protocol. A perfectly secure OTP-based communication setup between two different physical keys is presented. The digital XOR of keys from PUF A and B, which itself forms an encrypted OTP ciphertext, may be publically accessed by each party to form an information-theoretically secure link between the two uncopyable devices.

To communicate, two users, Alice and Bob, will first connect their personal CPUF devices over a known secure link (e.g., by physically meeting, or using QKD) to generate a shared random key. Once separate and mobile, they may securely exchange messages over any public channel until all shared key bits are exhausted. Besides offering OTP-strong encryption (i.e., eavesdropping is theoretically impossible), a secure CPUF link must meet the following requirements: first, its security must not depend upon any electronically stored data. Second, a malicious third party (Eve) with temporary access to a CPUF must not be able to efficiently copy its contents. And third, if Eve steals a device she must not be able to effectively send or receive messages.

Figure 7:
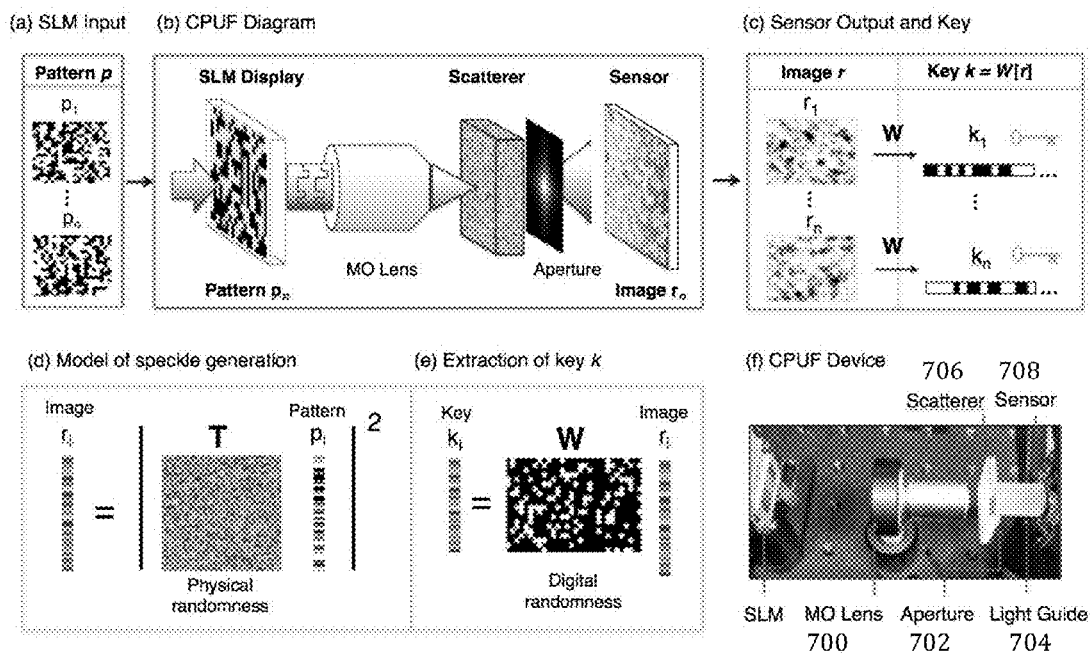
FIG. 7 a-f illustrate the construction and operation of a CPUF, according to one or more embodiments of the invention.

The above requirements are met by storing (extracting) random keys within the optical device outlined in FIG. 7.

FIG. 7(a) illustrates sequentially over time, n random phase patterns $p_i$ are displayed on an SLM.

FIG. 7(b) illustrates a microscope objective (MO) focuses each random wavefront from the SLM onto a volumetric scatterer. The scrambled light emerging from the material passes through a designed aperture before being detected by a CMOS sensor.

FIG. 7(c) illustrates each detected speckle image r is digitally transformed into an ideally random key k with a constant digital whitening projection W FIG. 7 (d) illustrates optical scattering is mathematically represented by a complex random Gaussian matrix.

FIG. 7(e) illustrates a digital whitening is described by a sparse binary random matrix W. The combination of one unique T and general W per CPUF device leads to an ideally random multi-gigabit key space that is very difficult to characterize or clone.

FIG. 7(f) illustrates the experimental CPUF setup, including all components in FIG. 7(b), including SLM, MO lens 700, aperture 702, light guide 704, scatterer 706, and Sensor 708.

To generate a key, a volumetric scattering medium is first illuminated with a random coherent optical wavefront defined by a spatial light modulator (SLM) (FIG. 7a). An output field emerges with a profile that depends on both the random input wavefront and the medium's random distribution and orientation of scattering particles. A designed aperture mask then shapes the output field before it propagates to an attached CMOS sensor (FIG. 7c). The mask is patterned to ensure the output speckle follows Markov statistics—an important condition for effective random key generation [37]. A combinatorially large space of possible wavelength-scale interactions enables detection of many mutually random speckle field outputs from very similar SLM phase profile inputs. As the size of both SLM and sensor pixels continue to shrink, potentially hundreds of gigabits of extractable randomness may be realized (Section IV.B).

This large amount of extractable physical randomness is summarized by mathematically representing optical scattering with a random transmission matrix [38] T (FIG. 7d). The output scattered field created by displaying the $i^{th}$ random SLM phase pattern $p_i$ may be described by $u_i = T \cdot p_i$. After the sensor detects the output field's intensity $r_i |u_i|^2$, a fixed whitening and noise removal operation W is applied to the speckle pattern to create a verifiably random and repeatable key $k_i$ (FIG. 7e). The SLM pattern $p_i$ and output key $k_i$ are thus connected by, $$k_i = W \cdot |T \cdot p_i|^2 \quad (5)$$

The projection of optical field $p_i$ into the random matrix T, uniquely defined by the volumetric scatterer within each CPUF device, imparts key $k_i$ with its unclonable security.

FIG. 8(a) illustrates during setup, Alice and Bob securely connect their two devices and generate n CPUF keys $k_{1...n}(A)$ and $k_{1...n}(B)$ using the same n input SLM patterns $p_{1...n}$. Each key-mixture $k_i(A) \oplus k_i(B)$ is saved in a digital dictionary that is assumed public, along with their corresponding SLM pattern $p_i$.

FIG. 8(b) illustrates that at a later time $t_c$, Alice may send Bob a ciphertext c with theoretically ideal security by selecting a pattern p from the digital dictionary, re-creating key k(A), and then XORing this key with her message m before transmitting it over a public channel. The digital dictionary can be saved locally on each device without any sacrifice to security.

FIG. 8(c) illustrates Bob decrypts the received ciphertext. He uses p to both re-generate key k(B) and to find the digital dictionary's corresponding key-mixture. The XOR of c with these two keys reveals the original message. No secret key is ever digitally stored, obfuscating any probe or copy attack.

FIG. 8(d) illustrates Experimental results of CPUF communication 24 hours after dictionary setup. Example messages, here as binary images, are encrypted to and decrypted from statistically random ciphertexts between two synchronized devices.

Figure 8:
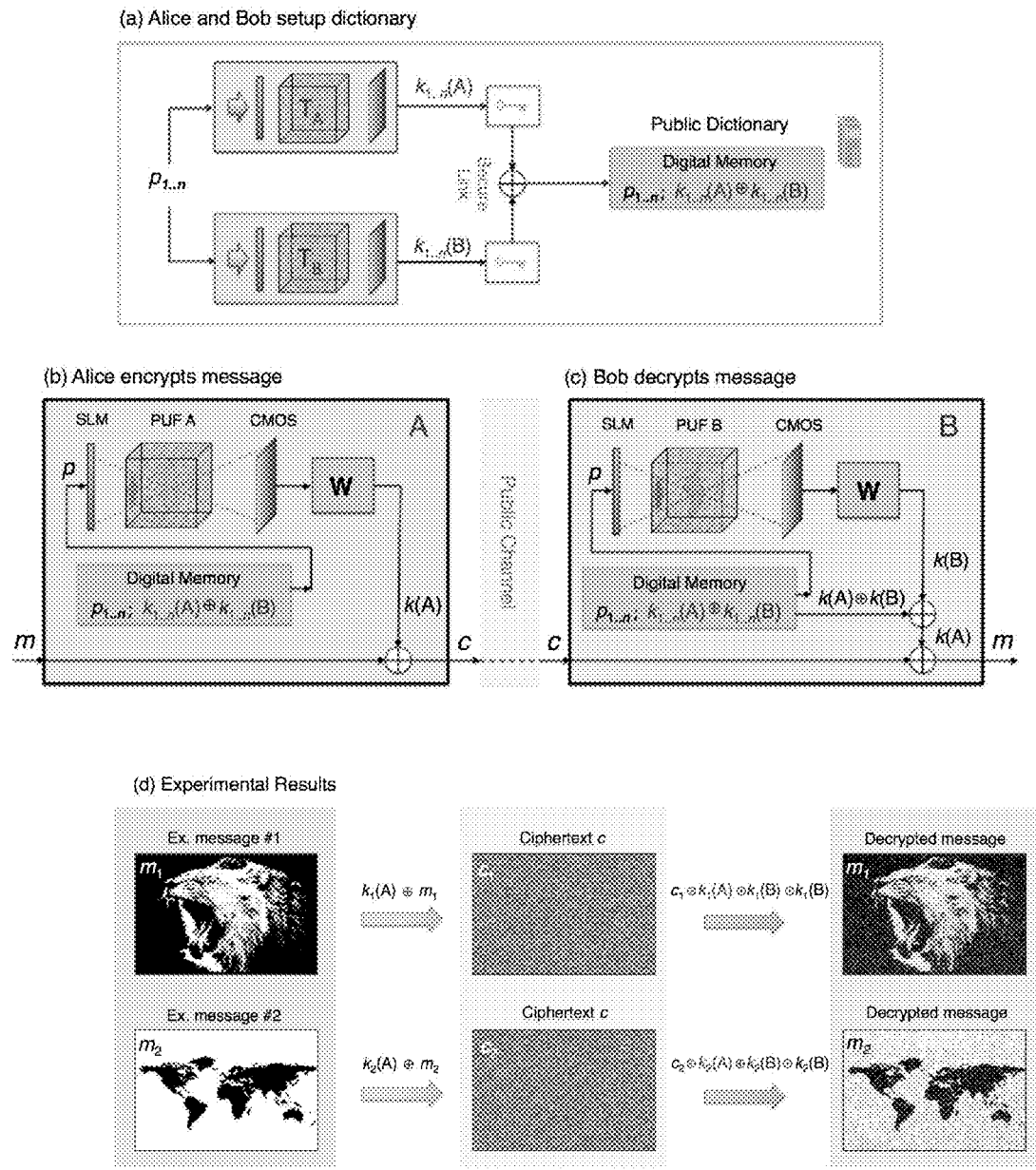
FIG. 8 illustrates ideally secure CPUF communication protocol and its experimental demonstration, according to one or more embodiments of the invention.

Thus, FIG. 8 illustrates a set of n random keys $k_{1...n}(A)$ generated by Alice's CPUF device, along with a corresponding key set $k_{1...n}(B)$ generated by Bob's device, enable physically secure OTP communication with the assistance of a digitally saved dictionary. As described above, Alice and Bob begin by establishing a secure connection between their two devices. While connected, they sequentially probe their scatterers with the same set of n random SLM phase patterns $p_{1...n}$, respectively detecting key sets $k_{1...n}(A)$ and $k_{1...n}(B)$ following equation (5) (FIG. 8a). Key sets $k_{1...n}(A)$ and $k_{1...n}(B)$ reflect each device's unique transmission matrix $T_A$ and $T_B$, but remain linked through Alice and Bob's shared use of SLM set $p_{1...n}$. Without leaving any digital trace of an individual key, Alice and Bob populate a public dictionary with each SLM pattern $p_i$ paired with the XOR of the two keys it generates, $k_i(A) \oplus k_i(B)$, for $1 \leq i \leq n$. An eavesdropper will gain no information about an individual key from this saved XOR "key-mixture", since it takes the form of a secure OTP ciphertext.

Once mobile at a later time $t_c$, Alice may securely send Bob a message m by first randomly selecting a pattern $p_i$ from the public dictionary to re-create key $k_i(A)$ (FIG. 8b). Then, Alice may use this key to create and send an XOR-encrypted ciphertext c, where $c = k_i(A) \oplus m$ (here we assume $k_i(A)$ and m are the same length—longer messages are encrypted by concatenating multiple keys). To complete the protocol, Alice must also send Bob the index i of the SLM pattern $p_i$ she displayed, which need not be encrypted.

Bob decrypts Alice's ciphertext using both his CPUF device and the public dictionary (FIG. 8c). He displays $p_i$ to optically regenerate key $k_i(B)$, and accesses dictionary entry i to obtain key-mixture $[k_i(A) \oplus k_i(B)]$. The decoded message is then obtained by an XOR of these two sequences with the received ciphertext:

$$k_i(B) \oplus [k_i(A) \oplus k_i(B)] \oplus (k_i(A) \oplus m) = m \quad (6)$$

The total number of secure bits N that Alice and Bob may share is proportional to the product of the number of saved key-mixtures n and the number of bits within each key |k|. Factors that limit N include display and sensor resolution, scatterer size, and allowed setup time (Section IV. A.).

The security of the above protocol relies upon the CPUF key sets following what Shannon defines a purely random process [1]. Possible deviations from pure randomness fall into three categories: correlated bits within the same key, correlations between keys, and the introduction of noise between keys generated at time $t_0$ and at time $t_c$. The sparse projection operator W overcomes such deviations to create keys that asymptotically approach information-theoretic security by sacrificing an increasing number of available encryption bits [39]. In practice, W's bit reduction factor is selected such that each CPUF's key set $k_{1...n}$, viewed as one multi-gigabit random sequence, passes all tests contained within two statistical random number generator test suites commonly accepted as the standard by which random sequences are certified (Diehard [40] and NIST [12], see Section IV. D).

The CPUF devices used in this experiment each contain a 2 megapixel transmissive phase SLM imaged onto opal-diffusing glass, serving as our highly random scatterer. A 2 cm thick light guide (to increase the average detected speckle size) connects the scatterer to a 4.9 megapixel CMOS detector. During public dictionary setup, we display n=5,000 different random binary phase patterns p to generate 21.8 GB of raw speckle data from two CPUFs, which is reduced to N=10 Gigabits (Gbits) of statistically verified randomness via the sparse matrix operator W. The approximate theoretical limit of 150 Gbits of randomness per CPUF device (derived in Section IV. A) may be achieved using a thicker volumetric scatterer, currently limited to 0.5 mm for optical stability purposes.

Experimental communication between two CPUF's using our physically secure OTP protocol is demonstrated $t_c = 24$ hours after public dictionary setup in FIG. 9d. Due to the slight drift of scatterers, message noise is introduced upon decryption. Error correction can help remove this noise, but reduces the total number of securely transmittable bits by a fixed fraction [41]. In the included experiment, repetition coding with a code rate of 0.025 improves the average bit rate error from 0.40 bits to 0.21 bits computed over 100 transmitted 1.4 Mbit messages.

With a stolen device, an eavesdropper Eve will require at least several hours to fully characterize the current CPUF's random structure at the current capture rate of ~1.5 seconds per key, which is sufficient to notice any attempted theft. Faster capture is not possible due to induced scatterer heating (see Section IV. G). Additional layers of security, such as encoding shared SLM patterns or enforcing a two-cycle communication requirement, help prevent Eve from utilizing a permanently stolen CPUF (Section IV. G). Our physically secure protocol also makes it impossible for Eve to recover any message after destroying each CPUF, simply achieved by slightly moving or heating the scattering material, which also resets the devices for a new communication round. While information-theoretic security is a good starting point for any new security mechanism, the proposed protocol still currently requires mixing of a message-length key over a secure connection during setup. A public-key protocol adopted to physical CPUF keys can remove any secure connection requirement and significantly reduce required key length, but at the expense of sacrificing perfect OTP security (Section IV. H).

3. Key Acquisition and Processing

Image capture and SLM screen control were driven through a Matlab interface. A low laser power (~2 µW) was used to illuminate the CPUF, preventing scatterer decorrelation and hence speckle pattern variation over time due to material heating. The low laser power used in experiment required an exposure time of approximately 1.3 seconds per image. After capture, the speckle is transformed into a 1D vector and whitened into a key via the matrix multiplication described in detail in Section IV.D, where one large sparse matrix W is stored locally on a desktop computer for use by both CPUF devices, along with the public dictionary containing the entire shared set of n random SLM patterns and the XOR key-mixtures after setup completion. We note that W need not be unique for each device, nor kept secret. Furthermore, the stored SLM patterns are selected uniformly at random to minimize the probability of key collision. Communication was achieved experimentally by populating a public dictionary, waiting 24 hours, and then using the same optical setup to execute the protocol outlined in FIG. 8. The error correcting procedure used to produce the final transmitted messages in FIG. 8($d$) is detailed in Section IV.E. Specific parameters used to encrypt and decrypt the displayed messages are presented in Table 1, where each message contains 0.4 Megabits (Mbits) after error correction.

IV. Further Examples of Testing of, Experimental Data for, and Theoretical Characterization of, the Example in Section III A. A Derivation of Expected Number of Random Bits Per Device The number of useful random bits $\epsilon$ extractable from an ideal CPUF device over its lifetime is limited by two physical phenomena. First, correlations between the pixels of each speckle image (caused by a finite average speckle size) limit the size of each random key. Second, correlations across the set of all possible speckle images place an upper limit on the number of uncorrelated random keys that each CPUF can produce. The whitening operator W removes correlations by decreasing the number of output random bits $\epsilon$. W allows the $\epsilon$-long output to asymptotically approach a completely random sequence as $\epsilon$ becomes small, as detailed in Section IV. B. Here, we find an approximate upper bound on the total number of random bits that we can expect W to extract from one CPUF device. This upper bound, derived from experimental measurements, is based on the product of the minimum number of random bits per image $\beta$ and the total number of uncorrelated images n per device: $\epsilon \leq \beta \cdot n$. Equality is achieved assuming the correlations contained within each speckle image do not vary between images.

1. Number of Random Bits Per Speckle Image $\beta$

A rough estimate of the number of random bits contained within each speckle image $\beta$ is found by considering the discretely detected speckle intensity pattern's entropy rate. The following calculations are based upon common assumptions regarding speckle detected a finite distance away from an ideal scattering surface [42]. The optical setup is discussed assuming a 1D geometry for simplicity, with direct extension to 2D. A coherent, polarized, monochromatic field is assumed, with many de-phased contributions as the field source at the back surface of the volumetric scatterer, which propagates to form a random speckle field $u(x)$ following circularly symmetric complex Gaussian statistics at the CMOS detector plane. The detector discretely samples and measures the intensity $|u(x)|^2$ at $g_x$ pixels each of width $\delta_x$, across which we assume the speckle field to follow spatially stationary statistics (i.e., the speckle statistics are spatially uniform). Each pixel in the detector exhibits a finite bit depth b (typically 8 bits), generating a detected intensity magnitude discretized into $2^b$ bins.

For a direct random bit estimate, we initially assume that each speckle exhibits a finite correlation within a particular range d, fixed by the average speckle size, and is zero elsewhere. This is equivalent to assuming the speckle exhibits a rect autocorrelation function of width d, which closely approximates the typical $\text{sinc}^2$ correlation function of speckle generated through an open aperture, given a small average speckle size. Such an approximation is found accurate in many practical systems [42], and is displayed in FIG. 9($a$) for an experimental CPUF speckle autocorrelation using a circular aperture geometry (autocorrelation width d=6 pixels).

Figure 9:
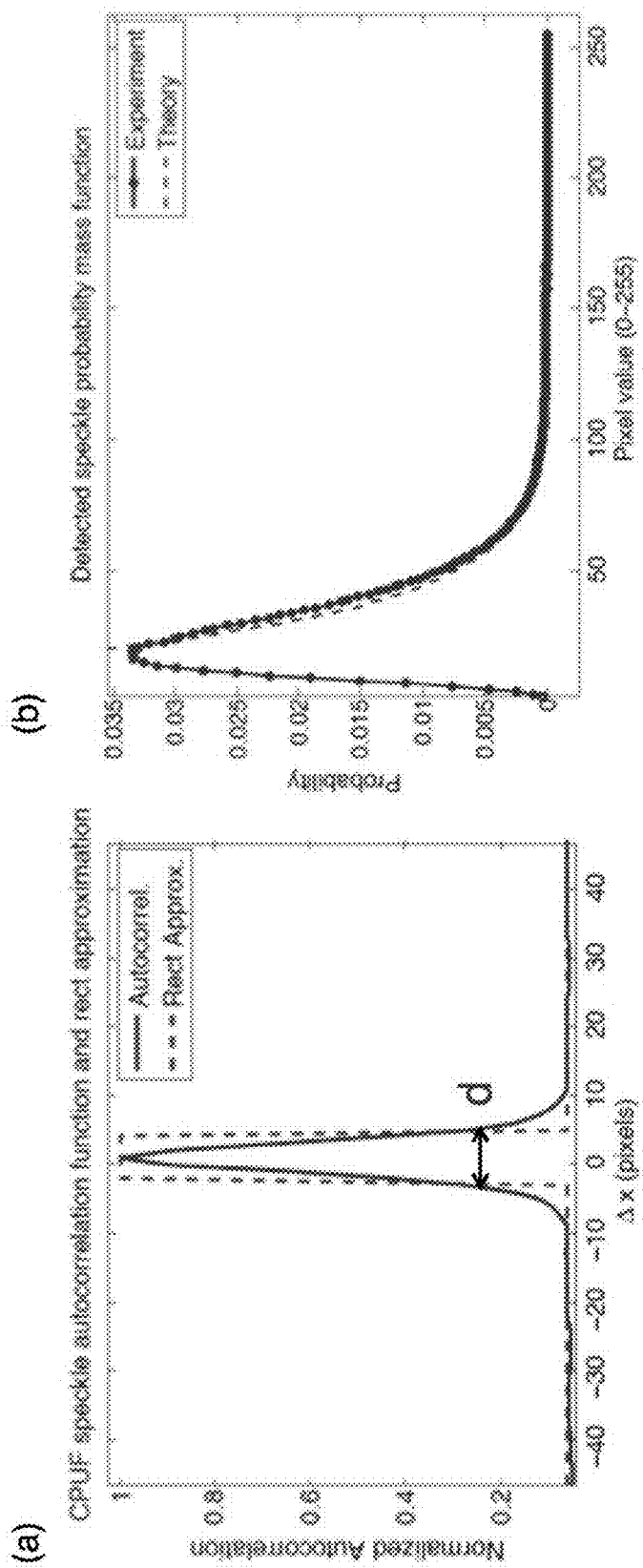
FIG. 9 illustrates CPUF characterization data, according to one or more embodiments of the invention.

FIG. 9 illustrates experimental data used to derive an estimated upper bound on the number of random bits per detected image. FIG. 9 ($a$) illustrates Speckle autocorrelation function obtained from our CPUF device. To derive a direct entropy upper bound, we approximate the experimental curve with the plotted rect function of width d. FIG. 9($b$) illustrates the probability mass function of speckle from the CPUF device, compared with a theoretical exponential curve [42]. Deviations from the exponential curve at lower pixel values are caused by the detection of depolarized light at the scatterer back surface.

Figure 10:
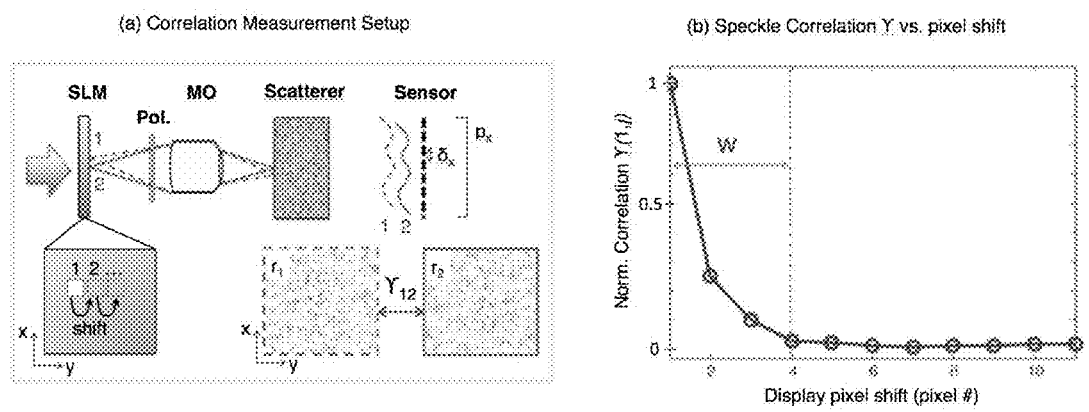
FIG. 10 illustrates removing scattering's inter-mode correlations, according to one or more embodiments of the invention.

FIG. 10 is a diagram of the setup with variables of interest labeled.

FIG. 10($a$) illustrates the experimental setup to measure the correlation between adjacent speckle modes. Sequentially turning on neighboring amplitude-modulating SLM pixels and recording speckle images allows calculation of correlation function $\gamma$. FIG. 10($b$) illustrates a plot of correlation parameter $\gamma$ from equation (8) for the tested CPUF. From this plot, it is clear that additional correlations exist between up to 4-6 pixels. We minimize these correlations by grouping SLM pixels into 4×4 block segments.

A finite correlation estimate offers the intuitive picture of $g_x$ sensor pixels measuring $g_x/d$ independent speckles, with each independent speckle extending across d pixels. A rect autocorrelation approximation thus allows us to replace the correlated speckle sequence $|u(x)|^2$ containing $p_x$ discrete measurements with a shortened vector v containing $g_x/d$ random variables, which we assume are uncorrelated given a sufficiently large d.

A sequence of $|v|$ biased (i.e., imperfect) random variables can be converted into a shorter sequence of $\beta$ independent, unbiased random bits using a procedure known as randomness extraction [43]. The efficiency of extraction is bounded by the entropy rate $H'(v)$ of the random process v. In other words, the number of random bits $\beta$ we may obtain is limited by our random process's entropy. Assuming ν follows spatially stationary statistics, we may calculate β with, $$\beta = (g_x/d)H(v) = -(g_x/d)\sum_{i=0}^{2^b} P(v_i)\log_2 P(v_i), \quad (7)$$

where $P(v_i)$ is the probability of one pixel taking on value $v_i$, the sum represents the per-pixel entropy $H(v)$, and the sum is performed over $2^b$ detectable values. Here, per-pixel entropy may be used instead of entropy rate assuming an identically distributed process across the sensor, which follows from our assumption of spatial stationarity [44]. An accurate estimate of the probability mass function $P(v)$ is achieved through an experimentally generated histogram of detected values, shown in FIG. 9(b). Based on this experimentally determined mass function, the entropy rate of the CPUF's speckle intensity is $H(v)=5.78+/-0.07$, where variations are associated with a slightly fluctuating image histogram over many experiments. Assuming a 2D separable geometry with a sensor containing 2592×1944 pixels and estimating the average speckle correlation width to extend over d=6 pixels in both dimensions, we arrive at an estimated $\beta=1.16\times10^6$ bits of randomness per detected image. We note this experimental procedure may be applied to any CPUF setup to arrive at a device-specific maximum random bit estimate. For example, scaling the current system to use a commercially available 40 megapixel sensor will result in each key containing close to 10 million random bits.

2. Number of Uncorrelated Speckle Images Per Device n

The number of uncorrelated speckle images per CPUF device may also be estimated through experimentally measured quantities. An upper bound on the number of independent speckle images needed to characterize a PUF device has been theoretically derived before in [5] and via information theoretical arguments in [45], which focuses on short keys used for identification. The upper bounds offered in this prior work assume various idealities that do not exist in our CPUF device. We instead derive a more accurate independent image estimate tailored to our CPUF's geometry, resolution and scattering material specifics through experimentally measured quantities, which is then compared to prior theoretical estimates.

First, we examine the transmission matrix T to arrive at a loose upper bound on the number of independent speckle images per device, n. Then, we refine n's estimate using experimental measurements. We begin with the ideal assumptions that T is an l×l random unitary matrix where l is the number of scattering modes [46], and that the SLM and sensor used with the setup each contain l pixels. A unitary approximation generally holds for highly scattering medium with many open channels (i.e., l is large). Deviations from this ideal condition are considered below. A unitary T guarantees the rank of T is l, and that its inverse exists as T*, the complex conjugate of T. In this case, we prove that l uncorrelated speckle images exist, and thus the upper bound on the ideal number of uncorrelated keys that can be extracted from T is n=l, as follows. Since the inverse of a unitary T exists and T is full rank, we can find a unique p that satisfies the equation u=T·p for any real, positive vector u by solving p=T*·u. Thus, u can be replaced with the quantity $r=|u|^2$ without loss of generality. Given that p=T*·r for any intensity vector r, we then see that an l×l, rank l matrix P can be constructed from a set of l orthogonal intensity column vectors combined into an l×l matrix R by solving $P=T^*\cdot|U|^2=T^*\cdot R$. P's full rank is trivially verified when R=I, the identity matrix. The existence of rank-l speckle intensity matrices R (real, positive) and P that satisfy the scattering equation thus indicates T can generate l uncorrelated speckle intensity images.

Assuming an ideal scatterer, the number of scattering modes l is proportional to the number of wavelength-sized spots that fit within the probing area $A_0$ of the scattering material through $l=2\pi c_0 A_0/\lambda^2$, where $c_0$ is a constant of order unity and we assume access to both polarizations [47]. From a calculated focal area of $A_0=1.6$ mm$^2$ for the tested CPUF's 10× objective lens imaging a 1.0×1.6 cm display, we arrive at $l=3.55\times10^7$ ideally addressable optical modes for our setup. This large number of scattering channels cannot be probed by the current CPUF's SLM display due to its limited resolution (2.09 Mpixels). Thus, the rough upper bound on the uncorrelated key count can be reduced simply to $n=2.09\times10^6$, the number of possible orthogonal probes available on the SLM. Future CPUF designs may better approximate the above ideal upper bound using an SLM display containing many more pixels.

The accuracy of the estimate of n is further increased by experimentally measuring deviations of CPUF scattering from the ideal operation of T, which is not perfectly unitary, in practice. Three specific forms of correlation are known to exist within the transmission matrix [11]. We experimentally account for the most dominant first-order correlation effect contained by T as follows. First, the SLM display is used in amplitude transmission mode by inserting an appropriately oriented polarizer between it and the scatterer. Only one SLM pixel at location (i, j) is turned on (i.e., is made optically transparent) with all other pixels off, and a speckle image is recorded. We repeat this process, turning on SLM pixel (i+s, j) and recording a speckle image, for s=(1, . . . , 20). The similarity between the initial and $s^{th}$ speckle image $r_s$ is calculated through a mean-subtracted overlap function γ:

$$\gamma_k = \sum_{a=1}^{g_x}(r_1(a)-\overline{r_1})(r_s(a)-\overline{r_s}), \quad (8)$$

where the sum is performed over each image's sensor pixels and is considered only along one sensor dimension. The results of such an experiment are in FIG. 10(b), where the presence of additional correlations extending out to Δw=4 SLM pixels are clear. These correlations appear to be an indication of the scattering memory-angle effect [48], but may also suggest a partially complete scattering process (i.e., T is not full-rank). We reduce these correlations, leaving <10% of γ's significance remaining, by grouping all SLM pixels into (2Δw)×(2Δw)=4×4 sets. This grouping further reduces the number of SLM degrees of freedom n by a factor of $(2\Delta w)^2=16$ to $n=1.3\times10^5$.

Comparing our final experimental bound on n to two prior theoretical approaches, we first find that the memory-angle method in [5] leads to $1.8\times10^7$ probable modes assuming a 10× objective and 0.5 mm scatterer thickness. Second, comparing our results to the simple upper bound in [45] we find our derived number of modes/is exactly half their upper bound, as polarization is not taken into account. Both values are close to our derived bound of $l=3.55\times10^7$, and both are greater than the current number of SLM pixels ($2.09\times10^6$).

3. Total Random Bits Per CPUF Device ε:

A tight upper bound on the total number of uncorrelated random bits per experimentally tested CPUF device is again given by the product of the number of unbiased bits per image β in supplementary section IV. A.1 above and the number of uncorrelated images per device n in section IV. A. 2 above:

$$\epsilon \leq \beta \cdot n = (1.16\times10^6 \text{ bits/image})(1.3\times10^5 \text{ images/device}) = 1.51\times10^{11} \text{ bits/device.} \quad (9)$$

Equation (9)'s upper bound easily scales to tens of terabits using commercially available SLM displays and CMOS sensors offering improved resolution.

In a practical encryption scheme, a limited database setup time enforces a tighter bound on n than suggested by equation (9). Currently, equation (9)'s upper bound requires over one day of CPUF setup time before a complete database of $10^5$ images is populated (approximately 28 hours at the current rate of 1 second per setup image). An approximate one-second delay between captured images is required to prevent heating of the scatterer, which causes keys to decorrelate over time. Future setups may attempt to achieve a practical upper bound by increasing the CPUF setup speed until the scatterer significantly decorrelates. Given the ability to avoid decorrelation, $\epsilon$'s upper bound can be detected by increasing n until the entire OTP sequence begins to fail statistical randomness tests due to introduced correlations. However, an exact statistical upper bound is difficult to determine for large n due to computational limitations. For example, the NIST test applied to an n=5000 image dataset requires approximately 30 hours on a modern processor (2.5 GHz, 16 GB RAM), scaling linearly until memory is exhausted.

B. Expected Number of Random Bits, Idealized Upper Bound

The derivation in Section IV. A incorporates non-ideal SLM and CMOS sensor pixel sizes to reach an accurate upper bound on the number of random bits per tested CPUF device. Neglecting these large pixel sizes leads to a much greater idealized number of random bits (i.e., upper bound estimate for an optimized CPUF setup). For simplicity, we determine an upper bound per device unit area. Three assumptions are required for our calculation. First, we pessimistically assume that our volumetric scatterer contains $l \sim 10^6$ modes per 1 mm$^2$ following the corresponding equation in [47]. Second, we assume access to an idealized SLM than can efficiently access all l of these scattering modes. Third, we assume that an ideal detector placed at the back surface of the 1 mm$^2$ scattering surface can obtain $(1 \text{ mm}/X)^2$ independent measurements. This corresponds to $4 \times 10^6$ pixels per mm$^2$ of detector with an illumination wavelength of $\lambda = 500$ nm. The product of the number of independent modes with the number of measurements per mode yields $4 \times 10^{12}$ measurements following an independent, biased process. Binary sampling to ensure an unbiased binary process leads us to a final approximation of 1 terabit of randomness per 1 mm$^2$ of scattering area for an idealized CPUF setup. This large amount of ideal randomness indicates that future devices should be able to easily improve upon the current number of derived (150 Gbits) and experimentally achieved (10 Gbits) random bits. Furthermore, this large space of randomness will scale linearly with scatterer area, given the above ideal conditions hold.

C. Patterned Apodizing Mask

Figure 11:
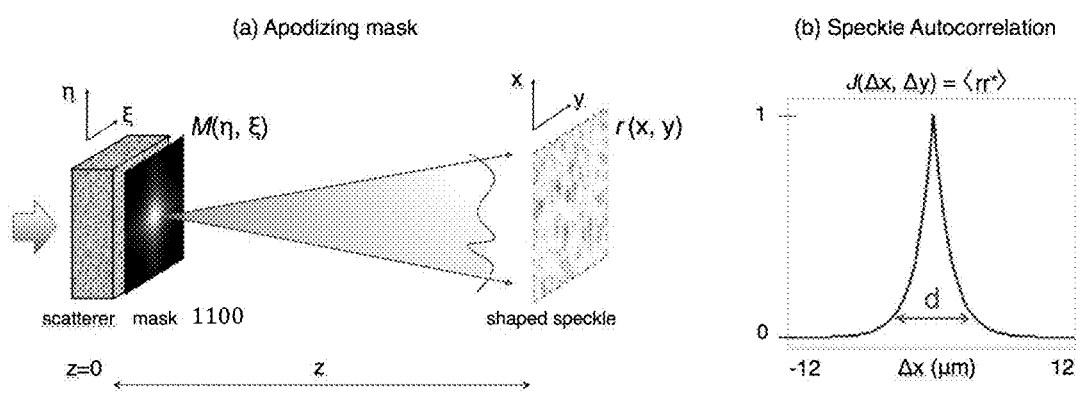
FIG. 11 illustrates a speckle apodizing mask guarantees randomness, according to one or more embodiments of the invention.

The CPUF's amplitude-modulating apodizing mask used in one or more embodiments serves at least three main purposes, two of which require its specific shape (FIG. 11).

FIG. 11(a) illustrates a Cauchy-Lorentz aperture mask $M(\eta, \xi)$ ensures the detected speckle obeys a hidden Markov process across space at the detector plane, required by the whitening operator W to ensure efficient randomness extraction.

FIG. 11(b) illustrates the Cauchy-Lorentz aperture leads to an exponentially correlated speckle field following a first-order Markov process, which in turn causes the intensity to follow a HMP, as demonstrated in (37).

First, the mask 1100 provides control over the size and shape of the exit pupil at the back surface of the scattering material. Assuming for simplicity that the mask is a circular aperture of radius $w_a$, the average speckle size d at the sensor is linked to $w_a$ through the simple relationship $d = \lambda \cdot z \cdot w_a^{-1}$, where z is the distance between the scatterer and sensor [42]. In one or more embodiments, the average speckle size d should be carefully chosen to extend over several sensor pixels. A large d offers more setup stability, but does so at the expense of sacrificing the number of extractable random bits per key.

Second, a more complete description of the shape of an average speckle is arrived at when an arbitrarily-shaped aperture distribution $M(\eta, \xi)$ is considered. The autocorrelation function of the speckle field u at the sensor plane is related to M via a Fourier transform relationship:

$$J(\Delta x, \Delta y) = \langle u(x,y) u^*(x,y) \rangle_{\Delta x, \Delta y} = (k/\lambda^2 z^2) \mathcal{F}[|M(\eta, \xi)|^2] \quad (10)$$

where a constant phase factor is neglected, k is the wavenumber and $\mathcal{F}$ represents a Fourier transform operation. The speckle intensity's autocorrelation $J_I$ is related to equation (10)'s field autocorrelation J through the simple relationship, $J_I = 1 + |J|^2$. The average shape of the detected speckle defined by its intensity autocorrelation may thus be controlled with a carefully designed $M(\eta, \xi)$.

One choice of mask function M guarantees that speckle processed by the whitening operator W converges to a uniformly random sequence. It is shown in (27) that W, based on projecting our speckle vector r into a sparse subspace with lower dimension, converges in statistical distance to an ideal random sequence when r follows a Hidden Markov Process (HMP). It is demonstrated in (25) that an apodizing mask $M(\eta, \xi)$ with an attenuation profile following a 2D-separable Cauchy-Lorentz distribution generates a complex speckle field that follows a first-order Markov process at the sensor. This condition also guarantees the CPUF's detected speckle intensity pattern follows a 2D HMP across space, as the field and intensity are connected by an underlying state-observation relationship. Specifically, the HMP's discrete state space is comprised of the field's possible complex values and its observation space is the discrete set of $2^b$ detectable speckle intensity values. Its emission matrix contains the conditional probability of observing intensity value $r(v_i)$ from any complex field value $u(v_i)$, and all matrix entries will all be zero except those which obey the deterministic relationship, $r(v_i) = |u(v_i)|^2$. So in summary, a second use of an apodizing mask M, if it follows a Cauchy-Lorentz distribution, is to create HMP speckle, which is proven to approach a truly random sequence of bits almost surely after digital whitening.

Third, a Cauchy-Lorentz apodizing mask serves to increase the detected speckle's entropy, and thus maximizes its number of extractable random bits for a fixed speckle size. A detailed support of this claim is also presented in (25). Here, we add three clarifying points. First, while the proof of random bit maximization in (25) is an exact solution for a detected complex field, extension to a detected intensity is direct following Theorem 9.6.5 in (33), which may lead to a maximized entropy upper-bound. Second, by considering entropy for a fixed dynamic range, we implicitly assume that any photons lost to blocked light are made up for by increasing the camera's shutter time. And third, this entropy maximization is for a field with fixed average speckle size d, with the relative entropy gain being low for small values of d, as in the case of the experimental CPUF setup where d only extends across approximately 5 sensor pixels.

D. Noise Reduction and Digital Whitening

Information-theoretically secure communication is achieved with an OTP encryption key that follows an ideally random sequence. A vector of speckle images $r_0$ describes a stationary, pseudo-random process but does not contain independent, unbiased bits. Thus, $r_0$ must be transformed through a randomness extraction procedure (sometimes called "digital whitening") from $|r_0|$ pseudo-random bits to a shorter sequence of $|k_0|$ ideally random, independent and unbiased bits. Several well-known methods of randomness extraction exist [43, 49, 50], along with more complex procedures such as seeded extractors [51]. While approaching the information-theoretic upper bound on efficiency in certain cases, all of these extraction methods are highly non-linear, and thus respond to errors caused by noise in an unpredictable manner. For example, a single erroneous flipped bit in an input to the extractors developed in [43, 49, 50] can alter the entire content and length of the whitened output, which is undesirable in our random key re-creation process that is known to contain a limited amount of noise (e.g., from laser fluctuations and sensor readout). In the following, we present a linear procedure based on multiplication of two large matrices that both removes this limited noise and extracts randomness in as robust and accurate a way as possible.

We first describe our noise removal method applied before randomness extraction to an input speckle sequence. CPUF output noise corresponds to components of a speckle image that change gradually over time, which we observe to occur primarily within its larger spatial frequency components. Removing these components will allow an output key $k_0(t=t_c)$ to more closely match a setup key $k_0(t=t_0)$ created during public dictionary setup. Previous work [5, 18, 45] has also digitally altered detected speckle patterns to improve their functionality as robust identification keys. In these setups, a reflecting scatterer is inserted and removed from a reading terminal multiple times. Micron-scale misalignments of the scatterer lead to dramatically different speckle images, from which similarities are extracted through a truncated discrete wavelet decomposition (DWT). While the wavelet coefficients are unbiased, they remain significantly correlated, on top of requiring a very large data reduction factor (removing more than 99% of the original data). The DWT may also be applied to CPUF noise reduction to remove a much smaller fraction of high-frequency image coefficients before digital whitening. However, we find that a simple truncated discrete Fourier transform (DFT) removes noisy image content more efficiently than the DWT. The operation of either the truncated DWT or DFT may be expressed by a $q \times |r_0|$ rectangular matrix F, where $|r_0|/q$ is the operation's bit reduction factor. Since the CPUF's scatterer is fixed to the detector, noise over the course of the tested duration of 24 hours is quite minimal, often allowing for a very small reduction factor in the range $|r_0|/q \approx 0.9-1$.

After removal of high spatial frequencies, we adopt a linear randomness extraction operation recently suggested in (27) to turn the speckle vector $r_0$ into a random key vector $k_0$. This linear operation is performed as a sparse binary random matrix multiplication (assuming a binary basis). One large sparse random matrix S per device is constructed using a pseudo-random number generator and then saved digitally (approximately $10^{12}$ matrix entries, with $10^8$ non-zero entries). We assume this matrix is publically known and may be accessed by an attacker without any loss of security. Its contained randomness adds no entropy to the random key $k_0$. Instead, its randomized construction simply facilitates efficient entropy extraction from each biased, weakly random speckle vector.

In the absence of noise reduction, the number of columns in S matches the length of speckle vector $r_0$, which for $n_c$ concatenated images equals $|r_0|=n_c \cdot g = n_c \cdot g_x \cdot g_y$, where $g_x$ and $g_y$ are the number of detector pixels along the x and y dimensions, respectively, and $|\cdot|$ indicates vector length. After reducing noise, the speckle vector is shortened by a set bit reduction factor from length $|r_0|$ to length q. The number of rows in S is set to the output key length $|k_0|=q/c$, $c>1$, where c is a whitening reduction factor estimated by considering the amount of correlation based on speckle size and probe geometry, as well as the deviation of the random process from a uniform random process. Mathematically, c defines the size of the subspace that a speckle sequence is sparsely projected into. In practice, an example speckle data vector $r_0$ from a particular CPUF configuration is processed as c is slowly increased until the output key set $k_0$ passes all Diehard and NIST randomness tests, indicating $k_0$ is a sufficiently random OTP sequence for most applications of interest.

TABLE 1

Experimental parameters. List of variables and their associated numerical values used for experimental CPUF demonstration.

| Parameter | Variable | Experimental Value |
|---|---|---|
| Sensor pixels (8-bit) | $g = g_x \cdot g_y$ | $5.03 \times 10^6$ |
| Raw speckle vector length | $|r_0|$ | $4.03 \times 10^7$ |
| Noise removal size reduction | $|r_0|/q$ | 0.95 |
| Noise-removed speckle vector length | q | $3.83 \times 10^7$ |
| Whitening reduction factor | c | 25 |
| Number of concatenated images | $n_c$ | 1 |
| Output key vector length | $|k_0| = n_c \cdot g/c$ | $2.40 \times 10^6$ |
| Sparse matrix density of 1's | $\rho$ | 0.0001 |
| Number of captured speckle images | n | 5000 |

After determining c, a second important parameter associated with matrix S is its measure of sparsity $\rho$, which gives its density of non-zero matrix entries. An optimal value of $\rho$ is selected to balance desired whitening, output noise and storage capabilities. For highly biased sources, an ideal value of $\rho$ is 0.5. However, such a large density of ones both leads to a computationally challenging matrix operation for typical key sizes (~$10^6$ bits). Given an already pseudo-random speckle source, we find that a density of $\rho \approx 0.001$ still generates keys that pass all statistical tests of randomness.

Figure 12:
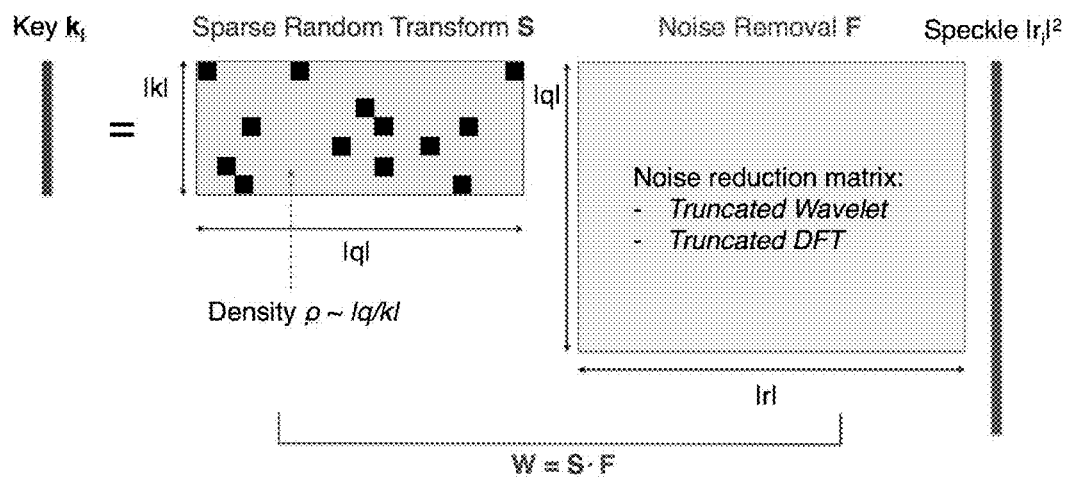
FIG. 12 illustrates the digital whitening operator W, according to one or more embodiments of the invention.

The noise minimization and randomness extraction matrices are applied together to create a key $k_0$ from speckle vector $r_0$ with $k_0 = SFr_0 = Wr_0$, where W is the whitening operation used in the text (see FIG. 12). FIG. 12 is a diagram of W used to turn speckle input $r_0$ into key $k_0$. Typical sizes associated with the above operations are listed in Table 1.

We note that this proposed randomness extraction method is efficient, but not optimal, for any $r_0$ following a Hidden Markov Process (HMP) [39]. As noted above, we guarantee $r_0$ follows an HMP using a Cauchy-Lorentz modulation mask at the scatterer's back surface, as discussed in [37]. Variable values used in experiment are listed in Table 1. Finally, we point out that while W must be "random" in the sense that each of the matrix elements of S should be uncorrelated, each device does not require a unique W. The proposed CPUF protocol remains information-theoretically secure even if we assume the same matrix W is shared across every CPUF device and is publically known.

E. Error Quantification and Correction

Even after applying experimental and post-processing methods to reduce the fluctuation of speckle images over time, a limited amount of error remains between CPUF keys generated at dictionary setup time $t_0$ and at communication time $t_c$. The main cause of non-vanishing error lies in the whitening matrix S, which must "mix" a pseudo-random speckle key with itself until it can pass all statistical tests. One bit within a final output key $k_0$ consists of a modulo addition mixture of $\rho \cdot q$ random bits from the speckle vector $r_0$. Here, $\rho \cdot q$ equals the number of non-zero entries in one row of S. The probability of an erroneous bit occurring is thus increased by a factor of $\rho \cdot g$.

As presented in this disclosure, the effect of erroneous bits may be removed with error correction. Examined previously for applications in biometrics (i.e., fuzzy commitment and extraction) as well as authentication via integrated circuits, we refer the interested reader to references (42-45) for details on security-preserving error correction with cryptographic applications. Since one or more embodiments of the present invention's demonstrated protocol is for message communication, we have the unique benefit of applying error correction directly to transmitted message bits. In our experiment, we utilized repetition coding, which is simply achieved by introducing redundancy into the transmitted message m. For example, every bit of m can be repeated κ times to create $m_r$, where $|m_r|=\kappa \cdot |m|$. Encryption, message transmission and decryption of $m_r$ unavoidably introduce bit-flip errors. For each segment of κ bits in the decrypted $m_r$, corresponding to a single bit in the original message m, we simply select the most frequent bit (the mode of the κ-bit set) as our best estimate for the correct corresponding bit of the original message m. This strategy requires that we use a key that is $\kappa \cdot |m|$ bits to encrypt $|m|$ bits of information, leading to a code rate of 1/κ.

Our protocol maintains information-theoretic security with error correction given an ideally random key. The ideal OTP hides all contained message information, independent of its contents. However, we note that a non-ideal key, for example suffering from a bias away from a uniform distribution, may leak additional message information when error correction is applied [41]. More advanced error correction procedures using information reconciliation can also offer guaranteed security in such non-ideal cases, but require Alice and Bob to exchange several messages [56].

FIG. 13(a) illustrates the normalized Hamming distance between 200 1 Mbit CPUF keys created using 200 random SLM patterns at time t=0, and the re-created at a later time $t_c$=24 hours, is shown in green 1300. When the same SLM pattern is used to re-create a key, only slight errors are observed after error correction (mean Hamming error at $t_c$=24 hours is $\langle \mu_k \rangle$=0.17 bits). The red distribution 1302 (on the right) displays the error between 100 1 Mbit keys generated using different random SLM patterns, where $\langle \mu_k \rangle$=0.50. This indicates that on average half the bits differ, as expected for keys that should be mutually random.

FIG. 13(b) illustrates A similar histogram (green distribution 1304) displays the Hamming error introduced to 200 messages after encryption and decryption (0.4 Mbit length before and after error correction at $t_c$=24 hours). Performing both encryption and decryption mixes two keys per message, causing larger errors than in (a). Each message is encrypted and decrypted using a unique key-mixture. The blue distribution 1306 is the same histogram of message error after applying an error correcting procedure to minimize noise. Here, the mean error is reduced to $\langle \mu_m \rangle$=0.29, and total transmittable bits are reduced by 9×.

Figure 13:
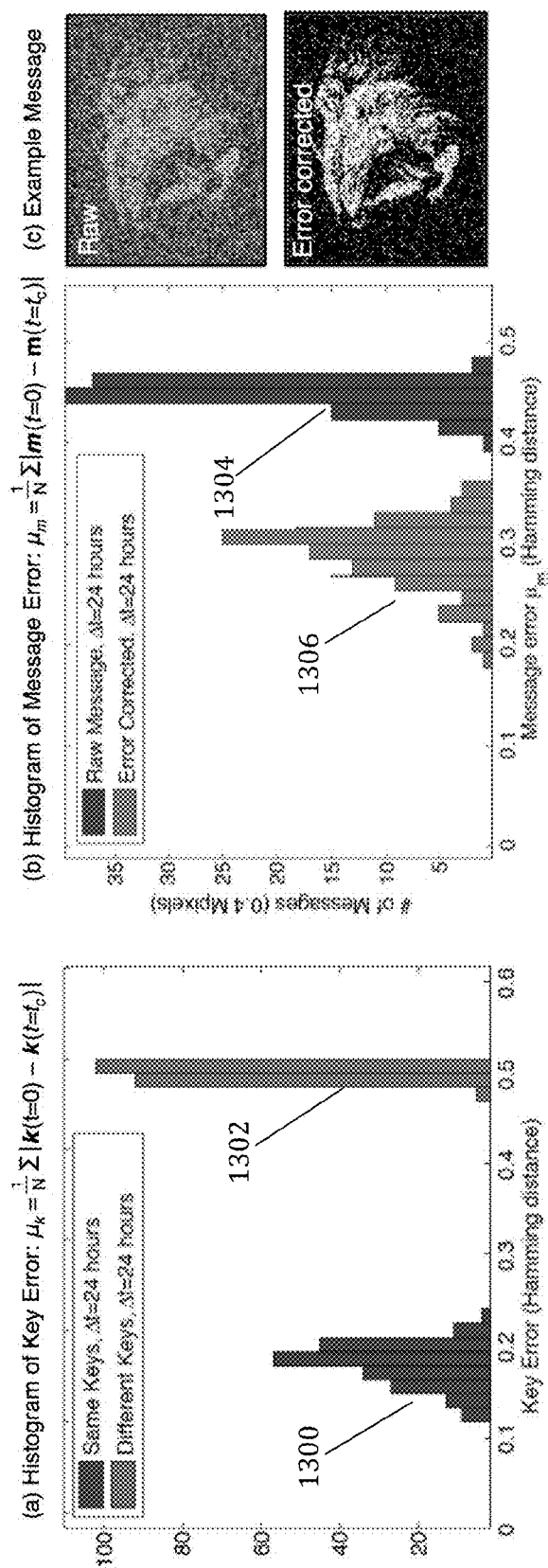
FIG. 13 illustrates an example experimental CPUF performance, according to one or more embodiments of the invention.

FIG. 13 (c) Example messages demonstrate the effect of error correction.

F. Statistical Randomness Test Performance

Statistical randomness test performance values for a typical sequence of concatenated random keys is presented in Table 2 and Table 3. Speckle data is whitened via the random matrix projection operator W explained above, using the same parameters as in the experimental demonstration (listed in Supplementary Table 1). The concatenated random vector containing all output keys passes all statistical tests assuming a statistical significance level of α=0.01.

The statistical test package used for the results in Table 2 is the Diehard statistical test suite[28] run on a full 10 Gbit string of randomness. Table 3 contains results from the NIST randomness test associated with Special Publication 800-22 [29, 47]. For the NIST test, the Gbits of data is segmented into 10,000 sequences, each 1 Mbit long, similar to the procedures used in prior randomness verification tests [24, 25], although our testing examines more data. The total length of concatenated data is limited to 10 Gbits due to computation time required primarily of the NIST test. Larger sequences of bits are expected to pass all tests until the total random bit upper bound ε derived in Section IV. B is approached.

G. Advanced Security Considerations and Protocols

Several works offer a mathematical framework to describe the cryptographic behavior of a PUF. We refer the interested reader to [58, 59, 32] for a more detailed consideration of possible attacks on non-optical PUF's, and to [36] for details regarding the difficulty of cloning, probing, or simulating an optical PUF's volumetric scattering material. Following, we consider the practical security of the CPUF's OTP-based protocol during typical use, and then turn to several cases of security given the CPUF is stolen by a malicious Eve.

TABLE 3

Example NIST statistical randomness tests performance.
NIST statistical randomness package performance of the same 10 Gbits of random CPUF data used in Table 2. For the NIST test, data is split into 10,000 unique 1 Mbit sequences following a common procedure [24, 25]. For 'success' using 10,000 samples of 1.Mbit data and significance level α = 0.01, the p-value (uniformity of p-values) should be larger than 0.0001 and the minimum pass rate is 0.987015. Tests that produce multiple p-values and proportions are denoted by a (+), followed by the number of different test values generated in parenthesis. The table displays the lowest (i.e., worst-case) generated p-values and proportions in the set.

| Statistical Test | p-value+ | Proportion | Pass/Fail |
|---|---|---|---|
| Frequency | 0.128 | 0.9895 | Pass |
| Block Frequency | 0.053 | 0.9925 | Pass |
| Cumulative Sums | 0.388+ (2) | 0.9897 | Pass |
| Runs | 0.760 | 0.9908 | Pass |
| Longest Run | 0.327 | 0.9899 | Pass |
| Rank | 0.028 | 0.9892 | Pass |
| FFT | 0.021 | 0.9874 | Pass |
| Non-overlapping Template | 0.003+ (147) | 0.9894 | Pass |
| Overlapping Template | 0.002 | 0.9879 | Pass |
| Universal | 0.226 | 0.9886 | Pass |
| Approximate Entropy | 0.156 | 0.9901 | Pass |
| Random Excursions | 0.163+ (8) | 0.9873 | Pass |
| Random Excursions Variant | 0.006+ (18) | 0.9902 | Pass |
| Serial | 0.031+ (2) | 0.9896 | Pass |
| Linear Complexity | 0.887 | 0.9889 | Pass |

1. Addressing Practical Concerns of OTP-Based Encryption

If one assumes that Alice and Bob's CPUF devices are never stolen, the proposed CPUF encryption scheme's security is effectively equivalent to that of a one-time-pad (OTP) based on a pseudorandom number source. It is direct to prove the OTP offers information-theoretic security [1]. Shannon's proof applies both to any encrypted message Alice sends as well as the key-mixtures saved within the public database. Common attacks such as known-plaintext, chosen-plaintext, and chosen-ciphertext reveal no information about previous or future messages given an ideally operating CPUF. While this "perfect" theoretical security is a strong starting point for a new physical method of communication, OTP's still suffer from several specific attacks and downsides, even if we assume the keys remain absolutely hidden from any third party:

Bit-flipping attack: The OTP is a malleable protocol [60]. An attacker may induce a predictable change in a message's plaintext m by altering its ciphertext c, without knowing the contents of m. Such attacks are prevented with an additional layer of security requiring message authentication, like a digital signature [61]. For example, if Alice encrypts m with its signature S(m) appended to it, Bob can use S(m) to validate whether m remained tamper-free during transmission. Including this digital signature thus allows Alice and Bob to ensure their CPUF-transmitted data is authentic.

TABLE 2

Example Diehard statistical randomness tests performance.
DieHard Random Test Suite performance of a typical sequence of 10 Gbits of random CPUF data concatenated into a single vector. A p-value > 0.0001 indicates a significance level of $\alpha = 0.01$, which is typically considered passing [24, 25]. Tests using the Komolgorov-Smirnov (KS) test to obtain a single statistical p-value are denoted with a "Y" in the last column. The lowest p-value is displayed for tests that generate multiple p-values without using the KS test. These tests are denoted with a (+) after their p-value, followed by the number of tests used in parenthesis.

| Statistical Test | p-value+ | Pass/Fail | KS |
|---|---|---|---|
| Birthday Spacings | 0.816 | Pass | Y |
| Overlapping Permutations | 0.856 | Pass | |
| Ranks of $31^2$ Matrices | 0.028 | Pass | |
| Ranks of $32^2$ Matrices | 0.707 | Pass | |
| Ranks of 6 × 8 Matrices | 0.642 | Pass | Y |
| Bitstream Test | 0.051+ (18) | Pass | |
| Overlapping Pairs, Sparse Occupancy | 0.099+ (22) | Pass | |
| Overlapping-Quadruples-Sparse-Occupancy | 0.015+ (27) | Pass | |
| DNA | 0.011+ (29) | Pass | |
| Count the 1's | 0.399 | Pass | |
| Count the 1's in Specific Bytes | 0.008+ (25) | Pass | |
| Parking Lot Test | 0.416 | Pass | Y |
| Minimum Distance Test | 0.530 | Pass | Y |
| Random Spheres Test | 0.090 | Pass | Y |
| The Squeeze Test | 0.812 | Pass | |
| Overlapping Sums Test | 0.002 | Pass | Y |
| Runs Test | 0.803 | Pass | Y |
| Craps Test | 0.130 | Pass | |

Keystream re-use attack: If a portion of any CPUF key is ever reused, the security of the CPUF protocol may be compromised. This concept is summarized by a keystream re-use attack (or replay attack), which is simply avoided by never re-using keys. If the CPUF's large space of randomness is not sufficient for a particularly large message, replacing the scatterer or heating it will effectively "reset" its space of randomness.

Re-sychronization attack: As with any stream cipher, perfectly synchronizing the sender and receiver is a challenge, especially with the addition of random channel noise. For example, the introduction of one erroneous bit in Alice's encrypted message may "shift" a segment of the ciphertext with respect to Bob's key, thus leading to a partially incorrect decryption. Re-synchronization procedures can assist with this problem, but are susceptible to attack [62]. We note that the CPUF includes a natural synchronization method through creating a set of display pattern input-key output pairs. These pairs serve to discretize the OTP into shorter segments, which allow Alice and Bob to re-align their keys every $|k| \approx 10^6$ bits, if necessary.

Required key size: Ideal OTP's unfortunately require their encryption key to equal the transmitted message length [63]. We expect future CPUF's to be able to keep up with large data transmission demands. Given current scaling trends of CMOS sensors and LCD-based displays, it is feasible to expect CPUF devices to scale to multiple-terabit randomness generation in the near future. Ideal security may be sacrificed by switching CPUF operation to a public-key protocol, which may require less than $10^5$ bits per communication session key. Such alternative protocols can be used.

Bit destruction: OTP users must be able to destroy the key bits they have already used. Digital storage mechanisms are inherently difficult to completely erase [17, 64]. Since the CPUF's keys rely upon multiple coherent scattering, any small scatterer perturbation will ripple through to significantly alter all keys, thus making them easily "erasable". Perturbations include moving or removing the sensor, heating or breaking the scatterer or generally inducing any irreversible change to the optical path. Such perturbations will destroy all of Alice and Bob's key bits—the CPUF system does not allow partial key space erasure.

Next, we examine the security claims that manifest themselves when a CPUF device is stolen, which helps set the CPUF's physical memory apart from storing communication keys within digital memory (e.g., Alice and Bob instead each hold a USB key with many random bits, which does not offer volumetrically random physical storage).

2. CPUF is Stolen for Fast Characterization

With a stolen device and control over the display, Eve can attempt to quickly determine the scatterer's structure by recording its optical response to all orthogonal display patterns. This is equivalent to mathematically cloning the transmission matrix T, which is of interest in scattering and time-reversal experiments [55]. By characterizing and digitally storing T, Eve can later eavesdrop and perform a man-in-the-middle attack by monitoring the screen pattern p associated with each transmitted ciphertext. If Alice and Bob's database is fully populated with every display pattern leading to an independent key-mixture, then such an attack will require Eve to measure all elements of T, which we claim requires an infeasible amount of time. As described in Section IV. A, T contains $\sim 10^8$ rows, while the SLM contains $2 \times 10^6$ pixels for the current CPUF device. We will begin with the assumption that full characterization of T is possible by probing the scatterer with each SLM pixel, by turning one pixel "on" at a time, as performed in [55]. This is a generous assumption since it assumes T may somehow be recovered from intensity-only measurements without detecting the complex field, which has yet to be demonstrated. We also assume image capture at 1 frame per second, which is currently shorter than the lower exposure time limit of approximately 1.5 seconds required to prevent scatterer heating and speckle pattern decorrelation. Scatterer heating is caused by both a high illumination beam intensity as well as sensor heating during rapid readout. Decorrelation from a faster probe rate leads each recorded speckle pattern to change into a nearly uncorrelated pattern within minutes. Based upon these two modest assumptions, Eve will require $2 \times 10^6$ seconds, or approximately 23 days, to measure a stolen device's T matrix. Assuming Eve can attach some cooling mechanism to probe the device at the SLM's maximum 24 frames-per-second rate, CPUF characterization will still require roughly 1 day. We assume that Alice or Bob will notice their device missing over such a long period.

If Alice and Bob's public dictionary is only partially populated with key-mixtures, then Eve may use the public dictionary to determine which display pattern subset $p_{1 \ldots n}$ will be used for future communication. In this situation, mathematical cloning time is bounded by the number of dictionary entries n. If n is small, simply adding a large amount of extra random "seed" data to the public dictionary may lengthen Eve's required cloning time. Alice and Bob could sift through this additional data by filtering out unsuccessful keys each communication attempt. Of course, such an approach is somewhat inconvenient. Instead, Alice and Bob may use several alternative procedures to distinguish dictionary-setup data from randomly seeded data while preventing Eve from doing so (see below). This will allow Alice and Bob to efficiently communicate, but forces Eve to attempt all dictionary display patterns to characterize a stolen device.

One alternative extension of adding random seed data is to setup a two-cycle communication protocol between Alice and Bob, which requires each party to send two messages before a secure connection is setup. When Alice wishes to communicate with Bob, she may randomly select a display pattern from the dictionary, generate a key, and send the key to Bob. Bob displays this key on his SLM, detects a new key, and sends his newly detected key back to Alice. Alice then uses the newly detected key from Bob as her display pattern $p_i$ in the typical CPUF communication protocol. One public dictionary for each direction of communication must be setup accordingly. With a stolen device, Eve may enter into the same two-pass protocol, but will need to contact Bob each time she wishes to receive a key, which will drastically slow down any attempt at quick device characterization. Downsides of such a scheme include reducing the available key-space and communication rate by a factor of two, opening up Alice's device to a certain degree of characterization, and introducing the possibility of a man-in-the-middle attack during display pattern sharing, which is preventable with additional authentication. However, taking advantage of the SLM's large number of degrees of freedom provides a practical path towards enhanced security, as discussed further next.

3. CPUF is Permanently Stolen or Replaced with a Replica

If Eve attempts to steal a CPUF with no intent of returning it, no ideal security solution exists to guarantee she cannot send and receive messages, since there is no perfect method of distinguishing Alice from Eve. However, additional security layers will help prevent Eve from using the device towards malicious ends. Instead of storing their display pattern set $p_{1 \ldots n}$ directly, Alice and Bob can adopt a protocol like the Advanced Encryption Standard (AES) to encrypt each pattern $p_i$ in $p_{1 \ldots n}$ before saving it in the dictionary. With a stolen device but without knowledge of the digital private key (i.e., a password) used to encrypt each display pattern, Eve will not know which patterns to use for quick CPUF characterization or for communication. First, without knowledge of the n patterns Alice and Bob used during dictionary setup, Eve is forced to perform full characterization of T, maximizing the required device characterization time. Second, Eve cannot send a valid ciphertext to either party or decrypt any previous or current ciphertext without knowing which pattern $p_i$ to display to create the required key $k_i$ for the given communication round (the probability of a correct guess from a set of $\sim 10^5$ independent binary elements that comprise $p_i$ is effectively zero). Third, even if Eve is somehow able to break the AES code, she must still have a way to recognize a correctly decrypted pattern $p_i$ from the set of all possible patterns. Since $p_i$ is random, the only way to check if her decryption is the correct pattern is to pass it through the device and see if the generated speckle matches a known ciphertext-cleartext combination of a message previously sent by Alice or Bob. This is clearly infeasible if the password is even moderately strong.

H. CPUF Public Key Protocol

As mentioned in this disclosure, a secret key can be setup between two CPUF devices, held by Alice and Bob, without requiring the formation of a secure connection prior to communication. Instead of following our modified OTP protocol, one of several public key protocols may be adopted instead. While they do not offer the OTP's perfect security, public key protocols may be of more practical use in situations where an initial secure meeting is inconvenient. Focusing on one of the most common public key protocols, the Diffie-Hellman exchange procedure, helps to clarify these points. For CPUF-based Diffie-Hellman exchange, Alice and Bob must first establish a connection over a public channel to agree upon a publically known prime base g and common prime number p. Second, Alice and Bob each generate one private key, $k_A$ and $k_B$, with their respective CPUF devices. Third, without saving $k_A$ in any permanent memory, Alice computes $p^{k_A} \bmod g$ (where mod is a modulo operation) and sends this "public key" to Bob. Bob creates, computes and sends a similar public key to Alice (using his private key $k_B$ instead of $k_A$ in the exponent). Any intermediate party may obtain the value of these two public keys. Fourth, Bob uses the public key created by Alice to compute $(p^{k_A} \bmod g)^{k_B}$, while Alice similarly computes $(p^{k_B} \bmod g)^{k_A}$ with the public key created by Bob. These two final computed numbers are equal modulo g, leading to a shared secret between Alice and Bob that is very difficult for an eavesdropper Eve to determine (she must overcome the discrete logarithm problem to determine this secret, $k_A$ or $k_B$ from anything transmitted over the public channel). Once a shared secret is established, Alice and Bob may rely upon a variety of well-known symmetric key algorithms (e.g., AES) to send and receive encrypted messages.

To avoid any reliance upon digital memory, it is clear that Alice and Bob must each re-generate their private CPUF keys $k_A$ and $k_B$ in the fourth step. During a practical communication setup, Alice and Bob will actually have to re-generate $k_A$ and $k_B$ multiple times. With the above public-key protocol, these private keys must remain absolutely noise free each time they are generated. Unlike the modified OTP protocol, three points allow absolute noise-free key generation to be quite achievable under a public-key framework. First, each public key $k_A$ and $k_B$ can be quite short—approximately 3000 bits is a sufficient length. Thus, heavy error correction procedures that reduce several million original noisy bits to several thousand noise-free bits may be adopted. Second, keys must remain free of noise for only a short period of time. While the OTP protocol requires keys to remain noise-free from the time of public dictionary setup, which may potentially extend to many days, a public-key protocol only requires noise-free keys throughout the duration of Alice and Bob's communication (typically on the order of several hours, at most). Third, if Alice and Bob communicate for a particularly long period of time and a key error does occur, a simple "fix" exists. Once an error is detected, Alice and Bob may simply just restart the public-key protocol with a new set of uncorrelated private keys. While leading to a new set of security measures that we will not explore in detail here, these three points generally suggest that CPUF-based public keys are a directly realizable and quite powerful encryption option in systems that wish to tradeoff ideal OTP security for a less stringent setup requirement.

V. Process Steps

Method of Fabrication

Figure 14:
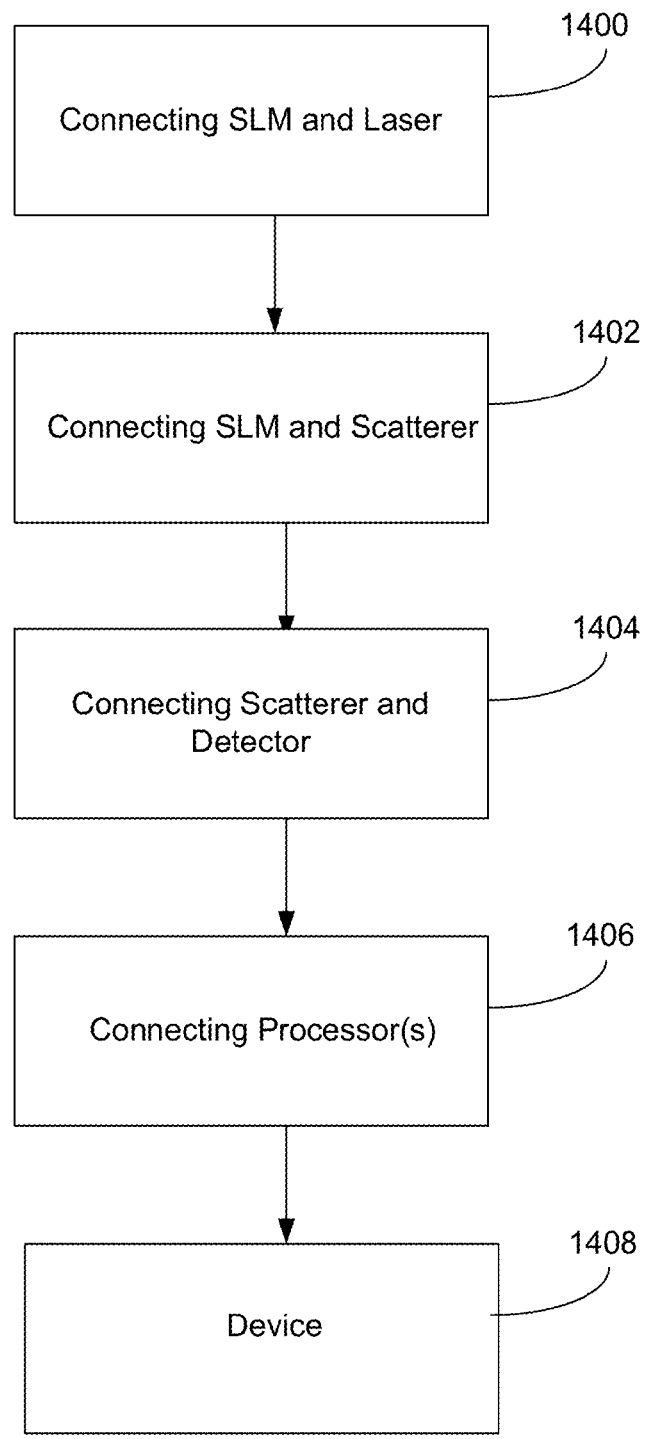
FIG. 14 illustrates a method of fabrication of PUF devices, according to one or more embodiments.

FIG. 14 illustrates a method of fabricating one or more Communication Physical Unclonable Function (CPUF) devices, according to one or more embodiments. Each CPUF can be fabricated as follows.

Block 1400 represents connecting (e.g. optically or electromagnetically coupling) an SLM to a coherent Electromagnetic (EM) or optical radiation source 100 (e.g., laser diode, semiconductor laser diode). The SLM comprises pixels and is positioned to receive, on the pixels, coherent EM radiation from the coherent EM radiation source. The pixels shape or modify a first phase and/or a first amplitude of the coherent EM radiation according to one or more patterns or a sequence of patterns, to form the patterned EM having a patterned phase and patterned amplitude. In one or more embodiments, the SLM typically modifies either the phase or the amplitude. In another example, both the phase and amplitude are modified. The pixels can represent a one or a zero of the pattern, wherein the pattern is random half ones and half zeros (half of the pixels are ones and half of the pixels are zeros).

In one or more embodiments, the SLM can come with a custom interface board that makes talking to it easy. For example, the SLM can be run through a VGA port as a "second screen" off of the same computer running Matlab(see e.g., [66]).

Block 1402 represents connecting (e.g., electromagnetically or optically coupling) the volumetric scattering medium 102 to the SLM. The volumetric scattering medium is positioned to receive and scatter patterned EM radiation into keyed EM radiation, the patterned EM radiation produced and transmitted by the SLM in response to the coherent EM radiation received on the pixels. The scattering medium shapes or modifies the patterned phase and the patterned amplitude of the patterned EM radiation into keyed phase and a keyed amplitude of the keyed EM radiation.

A refractive medium can be provided that produces a tailored focus of the patterned EM radiation on the scattering medium.

The scattering medium can comprise a material that does not decorrelate over time (for example, the scattering medium stable for at least 24 hours). The scattering medium can be an opal coated scatterer, glass, or opal coated glass, for example. In one or more embodiments, the scatterer is not Zinc Oxide (ZnO).

In one or more embodiments, an apodizing or aperture mask is provided on the volumetric scattering medium.

Block 1404 represents connecting (e.g., electromagnetically or optically coupling) a detector 104 to the volumetric scattering medium. The detector is positioned to detect an output speckle of the keyed EM radiation and can comprise a circuit that produces a digital signal in response to the keyed EM radiation. The scattering medium can be physically attached to the detector. The SLM can be physically attached to the scattering medium and sensor via a transparent medium. A lens system or refractive medium and distance between the SLM and the detector can be such that an overlap between the SLM's pixels and the detector's pixels is maximized. A distance between the volumetric scattering medium and the detector can matches a speckle size of the scattered EM radiation with the detector's pixels.

In one or more embodiments, the CMOS detector chip is this highest resolution one in [67] http://www.theimagingsource.com/en_US/products/oem-cameras/usb-cmos-mono/dmm72buc02ml/ and is a USB interface. The driver and interface with it can be installed through Matlab, for example. In one or more embodiments the set up can be like a USB webcam, except with direct access to the uncompressed images and control of the exposure time, etc.

Block 1406 represents electrically connecting one or more electronic circuits or processors (e.g., 1802, 1804). The step can comprise electrically connecting one or more randomizing processors or randomizing circuits to the detector. The processors or circuits can randomize the digital signal to transform the output speckle into a digital key used to encrypt a message. In one or more embodiments, all control electronics for the PUF device can be embedded within the scattering material or the detector. The processors can include one or more patterning processors or patterning circuits that generate, control, and input the patterns or sequence of patterns on the SLM, thereby obtaining a plurality of the keys. The processors can include one or more error correction processors or error correction circuits that perform error correction of the key. The processors can include microprocessors or microcontrollers. For example, the CMOS detector and SLM could be driven with an Arduino microcontroller, hooked up to a source of flash memory. Another example is a Raspberry Pi (with additional flash memory, for example).

The processors or circuits connected to the detector can perform a whitening algorithm, comprising transforming data, detected by the detector, into a column vector; and multiplying the column vector with a rectangular binary sparse random matrix, thereby producing a whitened key. The whitened key can efficiently approach perfect randomness as the key gets shorter, using the efficient number of operations that is used for matrix multiplication.

Block 1408 represents the end result, a device. The SLM, the scattering medium, and the detector can be in a package or integrated circuit and connected with stability such that a communication key stored in the CPUF device is at least 50% reproducible, or at least 50% bits are the same, at least 24 hours after formation of the key in the CPUF device.

In one or more embodiments, the whitening algorithm, the SLM's pixels, and stability of the CPUF device can reduce a size of speckle (or increase the number of speckles per unit area), thereby generating/producing, storing and extracting a key with increased amount of randomness (e.g., extracting many more random bits) and/or generating/producing, storing and extracting a key that is longer, or with a larger number of random bits. For example, the whitening algorithm, the SLM's pixels, and stability of the CPUF device, can be such that the CPUF device generates, stores, and extracts a key with more than 10000 random bits.

The SLM, the scattering medium, and the detector can form an optical circuit, be optically interconnected, attached to a printed circuit board, or be built in a monolithic or hybrid (photonic) integrated circuit (e.g., on a chip). Epoxy glue can be used to fix the SLM, scattering medium and detector.

Methods of Communicating

Figure 15:
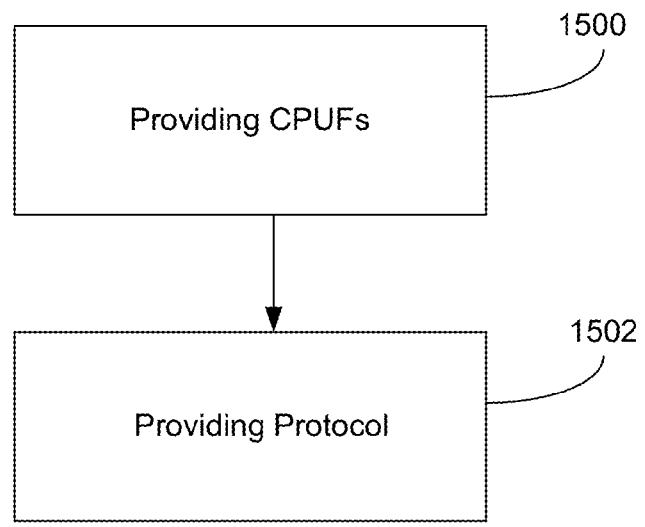
FIG. 15 illustrates a method of securely communicating, according to one or more embodiments.

FIG. 15 illustrates a method of secure communication, according to one or more embodiments.

Block 1500 represents providing a first party (Alice) and a second party (Bob) each with one of the CPUF devices.

Block 1502 represents providing a communication protocol.

Figure 16:
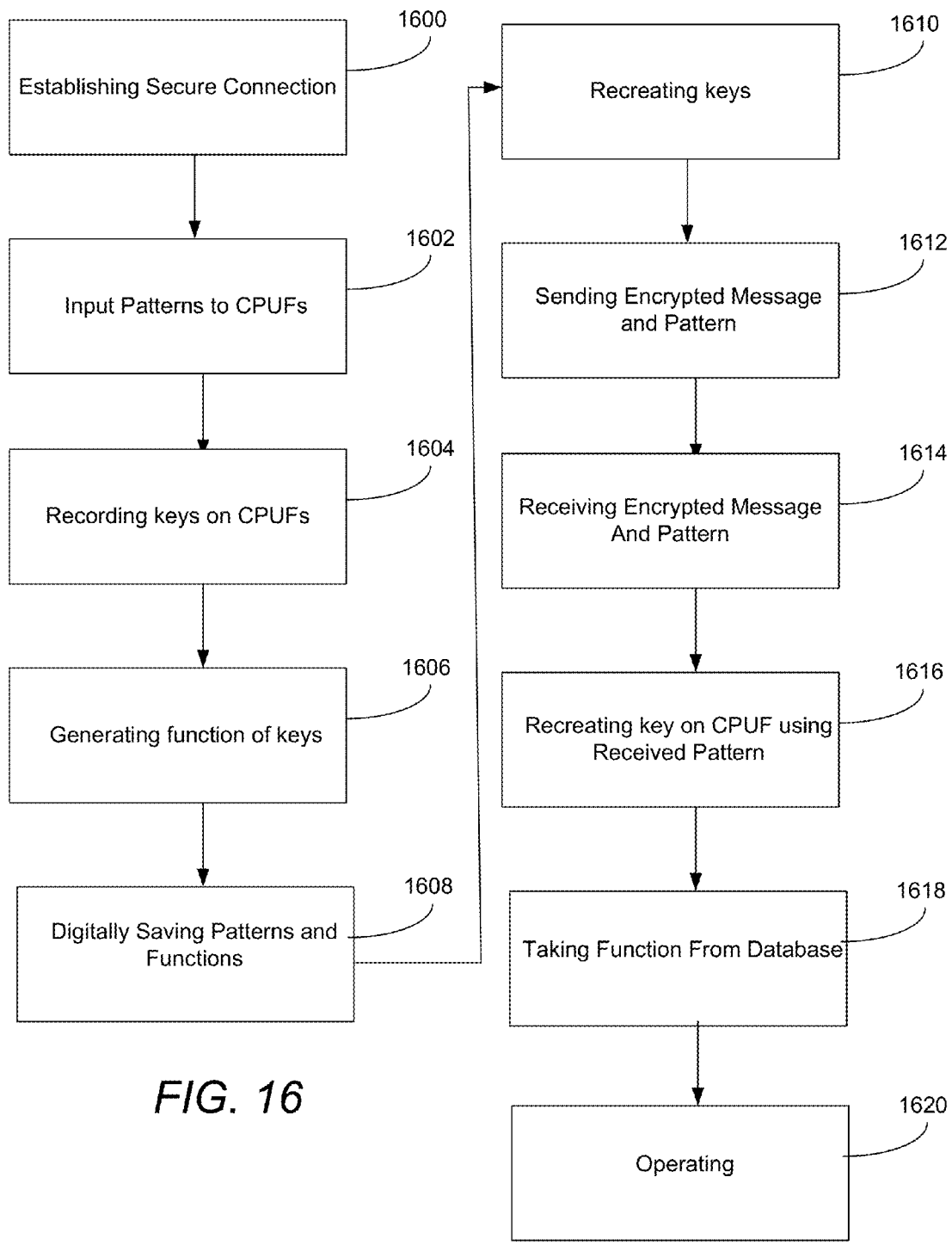
FIG. 16 illustrates a communication protocol, according to one or more embodiments.

FIG. 16 represents a communication protocol, according to one or more embodiments.

Block 1600 represents establishing a secure connection or meeting between Alice and Bob.

Block 1602 represents Alice and Bob inputting or showing a same pattern or same sequence of patterns on each of their CPUF devices. The steps can comprise (1) producing/creating a first key, in the first PUF device and at a first location, in response to the one or more patterns; and (2) producing/creating a second key, in the second PUF device and at the first location, in response to the one or more patterns.

Block 1604 represents Alice and Bob recording/storing the respective keys in each of their CPUF devices, using the same pattern.

Block 1606 represents generating or producing, in one or more processors/computers, a function (e.g., exclusive or, XOR) of the two keys, to form one or more key functions.

Block 1608 represents digitally saving (or storing in a digital fashion) the patterns and key functions as entries in a database, wherein each database entry comprises a pattern associated with the function and the key. The patterns and key function can be stored publicly, or privately in each of their own data storage devices or computers, such that Alice and Bob can both access them at a later time.

The above steps can be repeated for different patterns to produce several keys if each key is only good for some data size (e.g. one key for each megabit, wherein keys can be concatenated 1000 times to send Gigabits of information).

Alice and Bob can then go mobile or go anywhere separate.

Block 1610 represents the sender or Alice selecting one of the patterns and using her CPUF and recreating/reproducing her key or the first key, associated with the selected pattern (associated key). The first key can be recreated in the first PUF device and at a second location.

Block 1612 represents the sender or Alice encrypting a message with the associated key and sending the encrypted message and the pattern that is used to reproduce the key. The encrypting and sending can use a computer associated with Alice or in the possession/control of Alice, at the second location.

Block 1614 represents Bob receiving the encrypted message and the pattern. The receiving can be in a computer at a third location separate from the second location.

Block 1616-1622 represent Bob decrypting the encrypted message by (1) using the pattern to generate/recreate his key/second key with his CPUF device (Block 1616); (2) taking the entry in the database corresponding to the pattern that is received (Block 1618), and (3), operating on the encrypted message using his key and the database entry, to extract the message (Block 1620). The operating can include creating a second function of Bob's recreated second key and the database entry, and then using the second function to extract the message. Or, the second recreated key and the database entry can operate on the encrypted message to decrypt and extract the message. Blocks 1616-1620 can also take place in a computer at a third location, wherein the computer is associated with or in possession or control of Bob.

The first location is a physical location or locations where Alice and Bob have met or established a secure connection, and the second location and the third location are physical locations of Alice and Bob, respectively, after Alice and Bob have separated. The second and third locations can imply that Alice and Bob re-create the keys at a later time, e.g., Alice and Bob can be located at the second and third locations after they were located at the first location.

Figure 17:
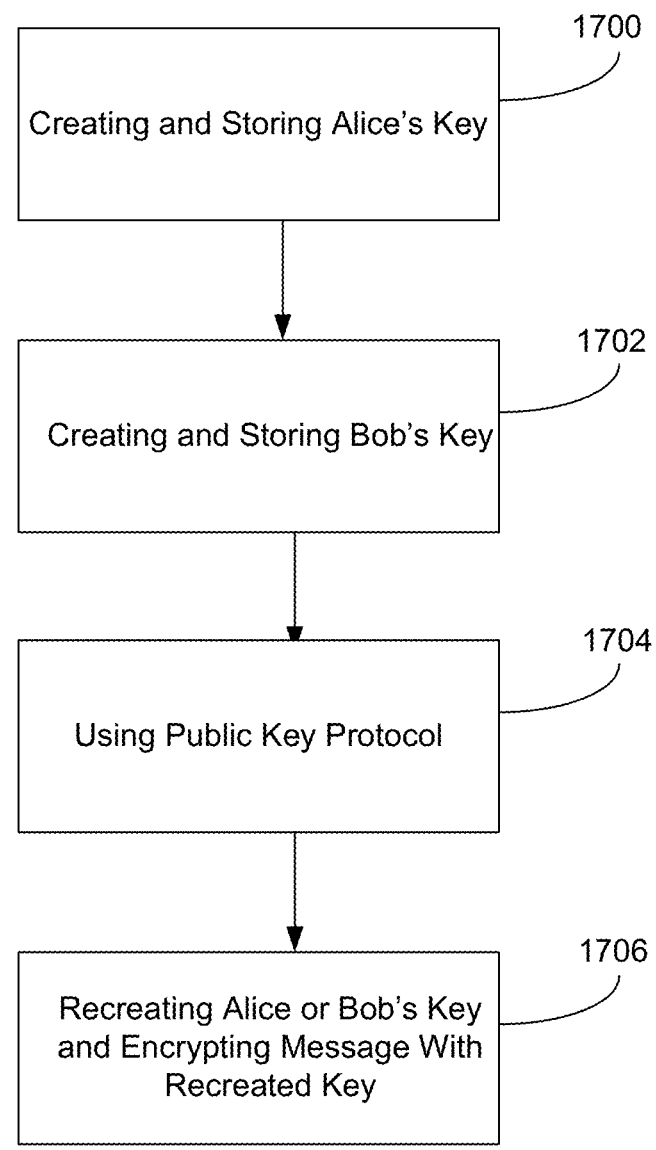
FIG. 17 illustrates a communication protocol, according to one or more embodiments.

FIG. 17 illustrates another example of a communication protocol.

Block 1700 represents creating and storing Alice's key $A_i$ using Alice's CPUF.

Block 1702 represents creating and storing Bob's key $B_i$ using Bob's CPUF. The patterns used to create the keys in Blocks 1700 and 1702 do not need to be the same.

Block 1704 represents using a public key protocol (e.g. RSA) to establish a secure connection between Alice and Bob. Alice and Bob do not have to meet.

Block 1706 represents recreating or reproducing Alice or Bob's key using their respective CPUF whenever is required by the public key protocol, wherein the recreated key has 0% error (1 bit cannot flip) as compared to the created key. The step can include using the recreated key to encrypt a message. The encryption can use the recreated key and standard encryption techniques.

VI. Hardware Environment

Figure 18:
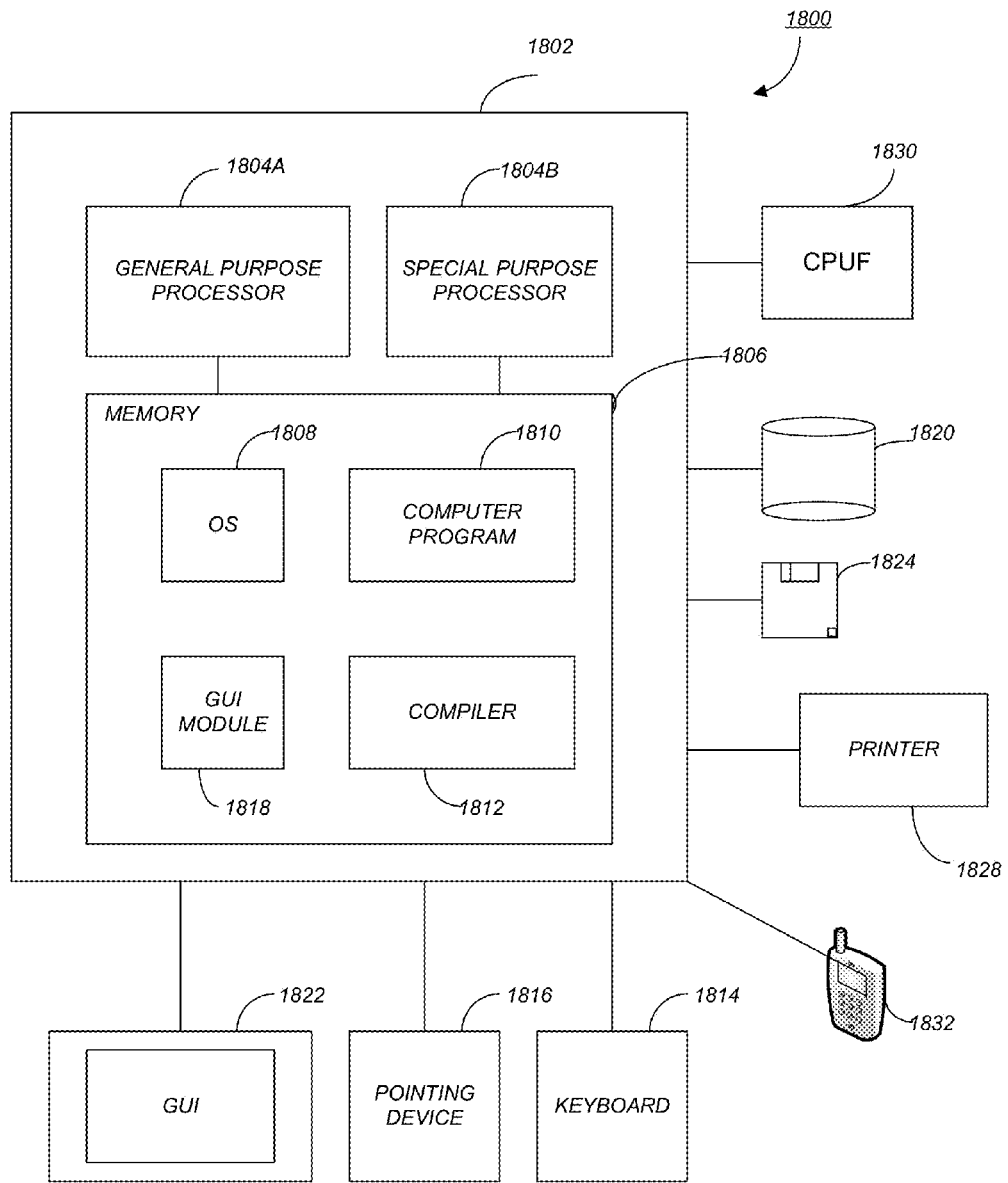
FIG. 18 is an exemplary hardware and software environment 1800 used to implement one or more embodiments of the processing, control, encryption, transmitting, or receiving functions of the invention.

FIG. 18 is an exemplary hardware and software environment 1800 used to implement one or more embodiments of the processing, control, encryption, transmitting, or receiving functions of the invention. The hardware and software environment includes a computer 1802 and may include peripherals. Computer 1802 may be a user/client computer, server computer, or may be a database computer. The computer 1802 comprises a general purpose hardware processor 1804A and/or a special purpose hardware processor 1804B (hereinafter alternatively collectively referred to as processor 1804) and a memory 1806, such as random access memory (RAM). The computer 1802 may be coupled to, and/or integrated with, other devices, including input/output (I/O) devices such as a keyboard 1814, a cursor control device 1816 (e.g., a mouse, a pointing device, pen and tablet, touch screen, multi-touch device, etc.) and a printer 1828. In one or more embodiments, computer 1802 may be coupled to, or may comprise, a portable or media viewing/listening device 1832 (e.g., an MP3 player, iPod™, Nook™, portable digital video player, cellular device, personal digital assistant, etc.). In yet another embodiment, the computer 1802 may comprise a multi-touch device, mobile phone, gaming system, internet enabled television, television set top box, or other internet enabled device executing on various platforms and operating systems.

In one embodiment, the computer 1802 operates by the general purpose processor 1804A performing instructions defined by the computer program 1810 under control of an operating system 1808. The computer program 1810 and/or the operating system 1808 may be stored in the memory 1806 and may interface with the user and/or other devices to accept input and commands and, based on such input and commands and the instructions defined by the computer program 1810 and operating system 1808, to provide output and results.

Output/results may be presented on the display 1822 or provided to another device for presentation or further processing or action. In one embodiment, the display 1822 comprises a liquid crystal display (LCD) having a plurality of separately addressable liquid crystals. Alternatively, the display 1822 may comprise a light emitting diode (LED) display having clusters of red, green and blue diodes driven together to form full-color pixels. Each liquid crystal or pixel of the display 1822 changes to an opaque or translucent state to form a part of the image on the display in response to the data or information generated by the processor 1804 from the application of the instructions of the computer program 1810 and/or operating system 1808 to the input and commands. The image may be provided through a graphical user interface (GUI) module 1818. Although the GUI module 1818 is depicted as a separate module, the instructions performing the GUI functions can be resident or distributed in the operating system 1808, the computer program 1810, or implemented with special purpose memory and processors.

In one or more embodiments, the display 1822 is integrated with/into the computer 1802 and comprises a multi-touch device having a touch sensing surface (e.g., track pod or touch screen) with the ability to recognize the presence of two or more points of contact with the surface. Examples of multi-touch devices include mobile devices or smartphones (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 1802 according to the computer program 1810 instructions may be implemented in a special purpose processor 1804B. In this embodiment, the some or all of the computer program 1810 instructions may be implemented via firmware instructions stored in a read only memory (ROM), a programmable read only memory (PROM) or flash memory within the special purpose processor 1804B or in memory 1806. The special purpose processor 1804B may also be hardwired through circuit design to perform some or all of the operations to implement the present invention. Further, the special purpose processor 1804B may be a hybrid processor, which includes dedicated circuitry for performing a subset of functions, and other circuits for performing more general functions such as responding to computer program 1810 instructions. In one embodiment, the special purpose processor 1804B is an application specific integrated circuit (ASIC).

The computer 1802 may also implement a compiler 1812 that allows an application or computer program 1810 written in a programming language such as COBOL, Pascal, C++, FORTRAN, or other language to be translated into processor 1804 readable code. Alternatively, the compiler 1812 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 1810 accesses and manipulates data accepted from I/O devices and stored in the memory 1806 of the computer 1802 using the relationships and logic that were generated using the compiler 1812.

The computer 1802 also optionally comprises an external communication device such as a modem, satellite link, Ethernet card, or other device for accepting input from, and providing output to, other computers 1802.

In one embodiment, instructions implementing the operating system 1808, the computer program 1810, and the compiler 1812 are tangibly embodied in a non-transient computer-readable medium, e.g., data storage device 1820, which could include one or more fixed or removable data storage devices, such as a zip drive, floppy disc drive 1824, hard drive, CD-ROM drive, tape drive, etc. Further, the operating system 1808 and the computer program 1810 are comprised of computer program 1810 instructions which, when accessed, read and executed by the computer 1802, cause the computer 1802 to perform the steps necessary to implement and/or use the present invention or to load the program of instructions into a memory 1806, thus creating a special purpose data structure causing the computer 1802 to operate as a specially programmed computer executing the method steps described herein. Computer program 1810 and/or operating instructions may also be tangibly embodied in memory 1806 and/or CPUF 1830, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1802.

The processors 1804a or 1804b may execute an encryption algorithm/program 1810 using the keys obtained from the CPUF, to encrypt a message stored in 1830. Processors 1804a or 1804b may perform the processing functions of Block 1406. The processors 1804a or 1804b may execute the randomizing/whitening operation W, or any other algorithms described in this specification, using program 1810. Computer 1802 can be used as the computer in FIGS. 16 and 17.

Figure 19:
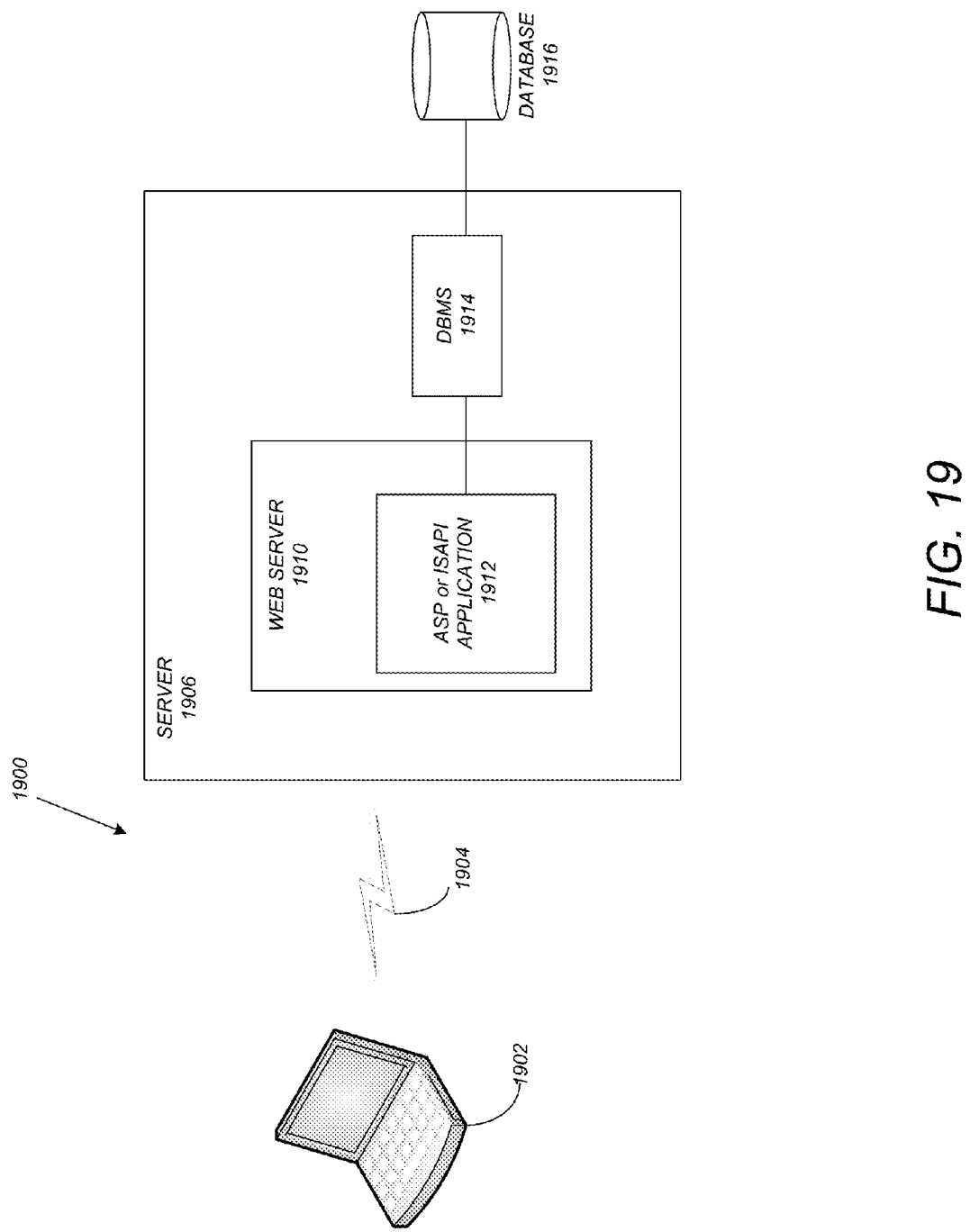
FIG. 19 schematically illustrates a typical distributed computer system 1900 using a network 1904 to connect client computers 1902 to server computers 1906.

FIG. 19 schematically illustrates a typical distributed computer system 1900 using a network 1904 to connect client computers 1902 to server computers 1906. A typical combination of resources may include a network 1904 comprising the Internet, LANs (local area networks), WANs (wide area networks), SNA (systems network architecture) networks, or the like, clients 1902 that are personal computers or workstations (as set forth in FIG. 18), and servers 1906 that are personal computers, workstations, minicomputers, or mainframes (as set forth in FIG. 18). However, it may be noted that different networks such as a cellular network (e.g., GSM [global system for mobile communications] or otherwise), a satellite based network, or any other type of network may be used to connect clients 1902 and servers 1906 in accordance with embodiments of the invention.

A network 1904 such as the Internet connects clients 1902 to server computers 1906. Network 1904 may utilize ethernet, coaxial cable, wireless communications, radio frequency (RF), etc. to connect and provide the communication between clients 1902 and servers 1906. Clients 1902 may execute a client application or web browser and communicate with server computers 1906 executing web servers 1910. Such a web browser is typically a program such as MICROSOFT INTERNET EXPLORER™, MOZILLA FIREFOX™, OPERA™, APPLE SAFARI™, etc. Further, the software executing on clients 1902 may be downloaded from server computer 1906 to client computers 1902 and installed as a plug-in or ACTIVEX™ control of a web browser. Accordingly, clients 1902 may utilize ACTIVEX™ components/component object model (COM) or distributed COM (DCOM) components to provide a user interface on a display of client 1902. The web server 1910 is typically a program such as MICROSOFT'S INTERNET INFORMATION SERVER™.

Web server 1910 may host an Active Server Page (ASP) or Internet Server Application Programming Interface (ISAPI) application 1912, which may be executing scripts. The scripts invoke objects that execute business logic (referred to as business objects). The business objects then manipulate data in database 1916 through a database management system (DBMS) 1914. Alternatively, database 1916 may be part of, or connected directly to, client 1902 instead of communicating/obtaining the information from database 1916 across network 1904. When a developer encapsulates the business functionality into objects, the system may be referred to as a component object model (COM) system. Accordingly, the scripts executing on web server 1910 (and/or application 1912) invoke COM objects that implement the business logic. Further, server 1906 may utilize MICROSOFT'S™ Transaction Server (MTS) to access required data stored in database 1916 via an interface such as ADO (Active Data Objects), OLE DB (Object Linking and Embedding DataBase), or ODBC (Open DataBase Connectivity).

Generally, these components 1900-1916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1902 and 1906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1902 and 1906.

Software Embodiment Overview

Embodiments of the invention are implemented as a software application on a client 1902 or server computer 1906. Further, as described above, the client 1902 or server computer 1906 may comprise a thin client device or a portable device that has a multi-touch-based display.

VII. Advantages and Improvements

One-time-pads are commonly acknowledged as the holy grail of cryptography [1], but have limited application in modern ciphers. While offering perfect theoretical security, the one-time-pad (OTP) protocol requires a large, random key space that must remain absolutely safe against malicious attempts to copy it. As demonstrated by numerous recent database breaches, such ideal key storage is difficult to practically realize, especially when electronic memory is used [2,3]. One or more embodiments of the present invention present an optical device that can deter copying and reproducibly generate gigabits of ideally random keys for secure communication. Each key is derived by optically probing the randomness stored within a complex, volumetric physical structure. While the unique, irreproducible microscopic disorder of such "physical unclonable function" (PUF) structures has been previously explored [4-6], a procedure applying physical randomness to secure communication has not. One or more embodiments of the communication PUF (CPUF) device is designed around a protocol that allows two parties to share a maximum number of secure random bits without digitally saving any sensitive key information. Besides bringing secure storage to the OTP, our CPUF system may additionally extend to public key-based protocols, which, as photonic devices begin to solve an increasing number of integrated circuit bottlenecks, indicates volumetric scattering as a natural and efficient communication key database.

Prior optical methods of establishing secure two-party communication include classical spatial [7] and temporal [8-12] setups, as well as quantum key distribution [13] (QKD). Each of these systems, including the unconditionally secure connection offered by QKD, must digitize its keys (until quantum storage is achieved [14,15]). In a world that increasingly requires secure mobile connectivity, a non-digital portable key storage medium resilient against invasive threats [2,3,16] can eliminate many of conventional electronic memory's intrinsic vulnerabilities [17]. Several non-optical secure storage methods use the inherent randomness within an integrated circuit, FPGA, or RFID chip [18-21], but offer a significantly limited bit capacity. Optical scattering has been previously examined for random number generation [22,23] and terminal-based identification and authentication protocols [4,5], including demonstrations of security against physical probing and modeling [6,24]. However, this prior work neither considered optical scattering as a means of achieving cryptographic communication nor established a procedure to create statistically random, temporally stable scattering keys, which are two challenges overcome our novel system and protocol address.

The specific form of PUF considered in one or more embodiments of the present invention uses a volumetric scattering medium, as first proposed in [5]. An input coherent optical field acts as the PUF's challenge. The interaction of the input field and the scattering medium produces a unique intensity distribution, or speckle pattern, which is the PUF's response. Slight perturbations in the amplitude or phase of the input field are created with a spatial light modulator (SLM). Due to the large amount of disorder within the scattering medium, each slightly perturbed input field produces a significantly varied output speckle pattern. Thus, keeping with the definition of a PUF, small changes to each challenge lead to a significant and random variation in response.

The volumetric scattering PUF offers three key advantages over storing any sort of random sequence digitally. First, due to their microscopic complexity, they cannot be physically cloned (a exact duplicate cannot be fabricated). Second, any attempt to probe the internal structure of the PUF will necessarily alter it and its response to any challenges, effectively destroying it. Finally, due to the large number of challenge-response pairs, it would take an adversary attempting a brute force attack of recording all pairs a significant amount of time (on the order of days), making any brute-force attack noticeable.

One or more embodiments of the present invention describe a secure encrypted communication method using two different optical scattering mediums as physical randomizing functions. One or more embodiments require that the two communicating parties meet beforehand. The physical device explained in section I prevents the need for any digital storage of secure keys, so they cannot be copied or distributed. The encryption protocol in section II allows two parties to communicate with absolute security (in an information-theoretic sense [1]) although they each hold a mutually independent randomizing function in the form of unique scattering mediums. One or more embodiments are of practical use in situations that require extremely safe encryption and security, especially when the need for secure communication is planned beforehand.

One or more embodiments of the demonstrated CPUF system can apply optical scattering to access billions of bits of randomness stored within an unclonable volumetric structure. Information-theoretically secure communication is achieved using a modified OTP protocol. Compared with a large, digitally saved one-time-pad, the CPUF's key is extremely challenging to copy or model, and can easily scale to provide terabits of repeatable randomness within a small volume. Embedding the device's digital electronics within its volumetric scattering material can further impede any attempted copy or probe attack. The convenient properties of optical scattering can solve enough of the OTP's practical shortcomings enable unbreakable security, even in the presence of infinite computing resources.

REFERENCES

The following references are incorporated by reference herein.

[1] C. E. Shannon, Communication theory of secrecy systems, Bell System Technical Journal 28(4), 656-715 (1949).

[2] I. Reidler, Y. Aviad, M. Rosenbluh and I Kanter, Ultra-high-speed random number generation based on a chaotic semiconductor laser, PRL 103, 024102 (2009)

[3] http://www.businessweek.com/news/2011-06-08/eme-s-rsa-security-breach-may-cost-bank-customers-100-million.html

[4] http://www.wired.com/threatlevel/2011/03/rsa-hacked/

[5] R. Pappu, B. Recht, J. Taylor and N. Gershenfeld, Physical one-way functions, Science 297, 2026-2030 (2002).

[6] U. Ruhrmair, G. Dror, F. Sehnke, S. Devadas, J. Solter, J. Schmidhuber, Modeling attacks on physical unclonable functions, Proceedings of the 17th ACM conference on Computer and communications security, 2010

[7] B. Gassend, D. Clarke, M. Van Dijk, and S. Devadas. Silicon physical random functions. In Proceedings of the 9th ACM Conference on Computer and Communications Security, page 160, 2002.

[8] Blaise Gassend, Dwaine Clarke, Marten van Dijk, and Srinivas Devadas. Controlled physical random functions. In Proceedings of 18th Annual Computer Security Applications Conference, 2002.

[9] P. Tuyls and B. Skoric, Strong authentication with physical unclonable functions, Security, Privacy and Trust in Modern Data Management, Data-Centric Systems and Applications (2), 2007

[10] P. Tuyls, B. Skoric and T. Kevenaar, Security with Noisy Data: Private Biometrics, Secure Key Storage and Anit-Counterfeiting. Springer 2007.

[11] S. Feng, C. Kane, P. A. Lee and A. D. Stone, Correlations and fluctuations of coherent wave transmission through disordered media, PRL 61(7), 834-837, 1988

[12] A. Ruhkin et al., A Statistical Test Suite for Random and Pseudorandom Number Generators for Cryptographic Applications, NIST Special Publication 800-22, csrc.nist.gov/groups/ST/toolkit/rng/documents/SP800-22b.pdf, 2001

[13] R. Brown, DieHarder: A Random Number Test Suite, Version 3.31, http://www.phy.duke.edu/~rgb/General/dieharder.php, 2012

[14] W. G. Ophey, B. Skoric, P. T. Tuyls and A. H. M Akkermans, Integrated physical unclonable function (PUF) with combined sensor and display, US Patent 2008/0231418 A1, 2008

[15] I. M. Vellekoop and A. P. Mosk, Universal optimal transmission of light through disordered materials, Phys. Rev. Lett. 101 120601, 2008

[16] Gennaro, R., Lysyanskaya, A., Malkin, T., Micali, S. & Rabin, T. Algorithmic tamper-proof (ATP) security: theoretical foundations for security against hardware tampering. Theory of Cryptography, Springer-Verlang LNCS 2951, 258-277 (2004).

[17] Anderson, R. & Kuhn, M. Tamper resistance—a cautionary note. In Proceedings of the 2nd USENIX Workshop on Electronic Commerce, 1-11 (1996).

[18] Skoric, B., Tuyls, P., and Ophey, W. Robust key extraction from physical unclonable functions. Proc. Applied Cryptography and Network Security Conference 2005. Lecture Notes in Computer Science 3531 (Springer-Verlag, New-York, 2005).

[19] Tuyls, P., Skoric, B. & Kevenaar, T. Security with Noisy Data Ch. 7,16 (Springer-Verlag, London, 2007).

[20] Matoba, O, Nomura, T., Perez-Cabre, E., Millan M. S. & Javidi B. Optical techniques for information security. Proc. IEEE 97 (6), 2009.

[21] Scheuer, J. & Yariv, A. Giant fiber lasers: a new paradigm for secure key distribution. Phys. Rev. Lett. 97, 140502 (2006).

[22] Zadok, A., Scheuer, J., Sendowski J. & Yariv, A. Secure key generation using an ultra-long fiber laser: transient analysis and experiment. Opt. Express 16 (21), 16680-16690 (2008).

[23] Goedgebuer, J. P., Larger, L. & Porte, H. Optical cryptosystem based on synchronization of hyperchaos generated by a delayed feedback tunable laser diode. Phys. Rev. Lett. 80, 2249-2252 (1998).

[24] Uchida, A. et al. Fast physical random bit generation with chaotic semiconductor lasers. Nature Photon. 2, 728-732 (2008).

[25] Kanter, I., Aviad, Y., Reidler, I., Cohen, E. & M. Rosenbluh. An optical ultrafast random bit generator. Nature Photon. 4, 58-61 (2010).

[26] Bennett, C. H. & Brassard, G. Quantum public key distribution system. IBM Tech. Discl. Bull. 28, 3153-3163 (1985).

[27] Schor, P. & Preskill, J. Simple proof of security of the BB84 quantum key distribution protocol. Phys. Rev. Lett. 85(2), 441-444, (2000).

[28] Mayers, D. Quantum key distribution and strong oblivious transfer in noisy channels. Lect. Notes Comput. Sci., 1109:343, (1996).

[29] Tuyls, P. et al. Read-Proof Hardware from Protective Coatings. In Cryptographic Hardware and Embedded Systems—CHES 2006 of Lecture Notes in Computer Science 4249, 369-383 (Springer-Verlag, London, 2006).

[30] NIST 2001 Security Requirements for Cryptographic Modules, FIPS PUB 140-2 (NIST, Gaithersburg, Md., 2011).

[31] Majzoobi, M., Koushanfar, F. & Potkonjak, M. Techniques for design and implementation of secure reconfigurable PUFs. ACM Trans. Reconfigurable Technology and Systems 2, 5-11 (2009).

[32] Gassend, B. et al. Controlled physical random functions and applications. ACM Trans. Information and System Security 10(4), 15-27 (2008).

[32] Lim, D. et al. Extracting secret keys from integrated circuits. IEEE Transactions on Very Large Scale Integration (VLSI) Systems, 13(10), 1200-1205 (2005).

[33] Bolotnyy, L. & Robins, G. Physically Unclonable Function-Based Security and Privacy in RFID Systems. Proc. IEEE International Conference on Pervasive Computing and Communications, 211-218 (2007).

[34] Marron, J., Martino, A. J. & Morris G. M. Generation of random arrays using clipped laser speckle. Appl. Opt. 25, 26-30 (1986).

[35] Devos, F., Garda, P. & Chavel, P. Optical generation of random-number arrays for on-chip massively parallel Monte Carlo cellular processors. Opt. Lett. 12(3), 152-154 (1987).

[36] Pappu, R. Physical One-Way Functions, Ph.D. dissertation, Massachusetts Institute of Technology (2001).

[37] Horstmeyer, R., Chen, R., Judkewitz, B. & Yang, C. Markov speckle for efficient random bit generation. Opt. Express 20, 26394-26410 (2012).

[38] van Rossum, M. C. W. & Nieuwenhuizen, T. M. Multiple scattering of classical waves: microscopy, mesoscopy and diffusion. Rev. Mod. Phys. 71, 313-369 (1999).

[39] Zhou H. & Bruck, J. Linear extractors for extracting randomness from noisy sources. Proc. IEEE Int. Symposium Info. Theory, 1738-1742, (2011).

[40] Marsaglia, G. DIEHARD: A battery of tests of randomness. <http://stat.fsu.edu/pub/diehard> (1996).

[41] Yu, M. & Devadas, S. Secure and robust error correction for physical unclonable functions. IEEE Design and Test 27, 48-65 (2010).

[42] Goodman, J. Speckle Phenomena in Optics (Ben Roberts and Company, 2007).

[43] Elias, P. The efficient construction of an unbiased random sequence. Ann. of Math. Stat. 43(3), 865-870 (1972).

[44] Cover, T. M. & Thomas, J. A. Elements of Information Theory (John Wiley and Sons, Inc., 1991).

[45] Skoric, B. On the entropy of keys derived from laser speckle: statistical properties of Gabor-transformed speckle. J. Opt. A: Pure Appl. Opt 10, (2008).

[46] Vellekoop, I. M. Controlling the Propagation of Light in Disordered Scattering Media. PhD thesis, Univ. Twente (2008).

[47] van Putten, E. Disorder-Enhanced imaging with Spatially Controlled Light. PhD thesis, Univ. Twente (2011).

[48] Freund, I., Rosenbluh, M. & Feng S. Memory effects in propagation of optical waves through disordered media. Phys. Rev. Lett. 61, 2328-2331 (1988).

[49] von Neumann, J. Various techniques used in connection with random digits. Applied Math Series 12, 36-38 (1951).

[50] Peres, Y. Iterating Von Neumann's procedure for extracting random bits. Ann. Stat. 20(1), 590-597 (1992).

[51] Nisan, N. & Zuckerman, D. Randomness is Linear in Space. J. Comput. Syst. Sci. 52(1), 43-52 (1996).

[52] Juels, A. & Wattenberg, M. A fuzzy commitment scheme. 6th ACM Conf. on Computer and Communications Security, ACM Press, 28-36 (1999).

[53] Dodis Y., Reyzin, M. & Smith, A. Fuzzy extractors: How to generate strong keys from biometrics and other noisy data. Proc. EUROCRYPT 2004 LNCS 3027, 523-540 (2004).

[54] Dodis Y., and Smith, A. Correcting errors without leaking partial information. Proc. ACM Symposium on Theory of Computing, 654-663 (2005).

[55] Guajardo, J., Kumar, S. S., Schrijen G. & Tuyls, P. Physical unclonable functions, FPGA's and public-key crypto for IP protection. IEEE Int. Symp. Circuits and Systems, 3186-3189 (2008).

[56] Brassard, G. & Salvail, L. Secret key reconciliation by public discussion. Proc. EUROCRYPT Advances in Cryptology 1993, 410-423 (1994).

[57] Kim, S. J., Umeno, K. & Hasegawa, A. Corrections of the NIST statistical test suite for randomness. arXiv:nlin.CD/0401040v1 (2004).

[58] Armknecht, F., Maes, R., Sadeghi, A., Standaert, F. & Wachsmann, C. Formal foundation for the security features of physical functions. Proc. IEEE Symp. Security and Privacy, 397-412 (2011).

[59] Ruhrmair, U. et al., Modeling attacks of physical unclonable functions. ACM Conf. Computer Comm. Security (CCS), 237-249 (2010).

[60] Dolev, D., Dwork C. & Naor, M. Nonmalleable cryptography. SIAM J. Computing 30(2), 391-437 (2000).

[61] Katz, J. & Lindell, Y. Introduction to Modern Cryptography Ch. 12 (Chapman & Hall/CRC Press, New York, 2007).

[62] Daemen, J., Govaerts, R. & Vanderwalle, J. Resynchronization weaknesses in synchronous stream ciphers. Proc. EUROCRYPT Advances in Cryptology 1993, 159-167 (1994).

[63] Schneier, B. Applied Cryptography: Protocols, Algorithms, and Source Code in C, Second Edition (John Wiley and Sons, New York, 1996)

[64] Anderson, R. & Kuhn, M. Low cost attacks on tamper resistant devices. In IWSP: International Workshop on Security Protocols, 125-136 (1997).

[65] Popoff, S., et al. Measuring the transmission matrix in optics: an approach to the study and control of light propagation in disordered media. Phys. Rev. Lett. 104(10), 100601 (2010).

[66] http://bbs-bildsysteme.com/html/epson.htm.

[67] http://www.theimagingsource.com/en_US/products/oem-cameras/usb-cmos-mono/dmm72buc02ml/

Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device, comprising one or more Communication Physical Unclonable Function (CPUF) devices, the CPUF devices capable of key storage and the CPUF devices each comprising:

a coherent Electromagnetic (EM) radiation source;

a spatial light modulator (SLM) connected to the coherent EM radiation source, wherein:

the SLM comprises pixels and is positioned to receive, on the pixels, coherent Electromagnetic (EM) radiation from the coherent EM radiation source; and upon receipt of the coherent EM radiation, the pixels shape or modify a phase and/or an amplitude of the coherent EM radiation according to one or more patterns or a sequence of patterns, to form and transmit patterned EM radiation having a patterned phase and a patterned amplitude;

a volumetric scattering medium connected to the SLM, wherein:

the volumetric scattering medium is positioned to receive and scatter the patterned EM radiation into keyed EM radiation; and upon receipt of the patterned EM radiation, the volumetric scattering medium shapes or modifies the patterned phase and the patterned amplitude of the patterned EM radiation into a keyed phase and a keyed amplitude of keyed EM radiation;

a detector connected to the volumetric scattering medium, the detector positioned to detect an output speckle of the keyed EM radiation and comprising a circuit that produces a digital signal in response to the keyed EM radiation; and one or more processors or one or more circuits connected to the detector and one or more processors or one or more circuits connected to the SLM, wherein one or more of the processors or one or more of the circuits randomize the digital signal to transform the output speckle into a digital key used to encrypt a message.

2. The device of claim 1, wherein the SLM, the volumetric scattering medium, and the detector are in a package or integrated circuit, and connected with stability such that a communication key stored in the CPUF device is at least 50% reproducible, or at least 50% of bits in the key are the same, at least 24 hours after formation of the key in the CPUF device.

3. The device of claim 1, wherein:

the volumetric scattering medium is attached to the detector via a first refractive medium;

the SLM is physically attached to the volmetric scattering medium and sensor via a second refractive medium; and
all control electronics for the CPUF device are embedded within the volumetric scattering medium.

4. The device of claim 1, further comprising a refractive medium and distance between the SLM and the detector, wherein an overlap between the SLM's pixels and the detector's pixels is maximized.

5. The device of claim 1, further comprising a refractive medium that produces a tailored focus of the patterned EM radiation on the volumetric scattering medium.

6. The device of claim 1, wherein the one or more processors or the one or more circuits connected to the SLM generate, control, and input the one or more patterns on the SLM to obtain one or more keys.

7. The device of claim 1, wherein each of the pixels represents a one or a zero of one of the patterns, and the one of the patterns comprises random half ones and half zeros.

8. The device of claim 1, further comprising a distance between the volumetric scattering medium and the detector that matches a speckle size of the keyed EM radiation with the detector's pixels.

9. The device of claim 1, wherein the volumetric scattering medium comprises a material that does not decorrelate over time or is stable over at least 24 hours.

10. The device of claim 1, wherein the volumetric scattering medium is an opal coated scatterer.

11. The device of claim 1, further comprising an apodizing or aperture mask on the volumetric scattering medium between the volumetric scattering medium and the detector, wherein the mask shapes the output speckle.

12. The device of claim 1, wherein the one or more processors or the one or more circuits connected to the detector include one or more error correction processors or error correction circuits that perform error correction of the key stored in the CPUF device.

13. A system comprising the CPUF devices of claim 1 for securely communicating between a first party and a second party, further comprising:
a first one of the CPUF devices;
a second one of the CPUF devices; and
computers including a first computer and a second computer;
wherein the CPUF devices and the computers perform one or more of the following functions:
(1) producing one or more first keys, in the first CPUF device at one or more first locations, in response to the one or more patterns;
(2) producing one or more second keys, in the second CPUF device at the one or more first locations, in response to the one or more patterns,
(3) producing or generating in one or more of the computers at the one or more first locations, one or more functions wherein each function is a function of one of the first keys and one of the second keys generated by the same pattern;
(4) storing in one or more databases on one or more of the computers, the patterns, the functions, and an association between the functions and the patterns;
(3) re-creating or reproducing one of the first keys, in the first CPUF device at a second location, using one of the patterns, to form a re-created or reproduced first key;
(4) encrypting, in the first computer at the second location, a message with the re-created or reproduced first key, forming an encrypted message;
(5) sending or transmitting, from the first computer at the second location, the encrypted message and the one of the patterns;
(6) receiving, in the second computer at a third location, the encrypted message and the one of the patterns;
(7) re-creating or reproducing in the second CPUF device at the third location, one of the second keys using the one of the patterns, to form a re-created or reproduced second key;
(8) obtaining, from the databases, the function corresponding to the one of the patterns;
(9) operating, in the second computer at the third location, on the encrypted message using the re-created or the reproduced second key and the function, thereby decrypting the message; and
wherein:
the first location comprises a physical location or locations where the first party and the second party have met or established a secure connection, and
the second location and the third location are physical locations of the first party and the second party, respectively, at a later time and after the first party and the second party have separated.

14. The system of claim 13, wherein:
the function is an XOR operation between the first key and the second key;
the encryption is an XOR operation between the message M expressed in binary and the binarized first key $b_i$, producing the encrypted message $M \oplus b_i$; and
the operating is a double XOR procedure of the encrypted message $(b_i \oplus M) \oplus (b_i \oplus a_i) \oplus a_i = M$, wherein $a_i$ is the reproduced second key and such that an output of the XOR process is the original message M.

15. The system of claim 13, wherein the first computer concatenates a plurality of the first keys to encrypt a message that is longer than each of the first keys.

16. A system comprising the CPUF devices of claim 1 for communicating between a first party and a second party, further comprising:
(a) a first one of the CPUF devices that creates, stores, and re-creates or reproduces one or more first keys upon receipt of one or more first patterns;
(b) a second one of the CPUF devices that creates, stores, and re-creates or reproduces one or more second keys upon receipt of one or more second patterns;
(c) one or more computers that:
encrypt a message using one of the re-created or reproduced keys, wherein the re-created or reproduced key has 0% error as compared to the created key; and
use a public key protocol to establish a secure connection between the CPUFs and transmit or receive the encrypted message.

17. The device of claim 1, wherein the one or more processors or circuits connected to the detector perform a whitening algorithm, comprising:
transforming data comprising the output speckle, detected by the detector, into a column vector; and
multiplying the column vector with a rectangular binary sparse random matrix, thereby producing the digital key comprising a whitened key.

18. The device of claim 17, wherein the whitening algorithm, the SLM's pixels, and stability of the CPUF device, are such that the CPUF device generates, stores, and extracts a key with more than 10000 random bits.

19. A method of encrypting and/or decrypting, comprising:
(a) obtaining or providing a first device and a second device, the first and second devices each comprising:

a volumetric scattering medium connected to a source of patterned Electromagnetic (EM) radiation;
a detector connected to the volumetric scattering medium; and
one or more processors and/or one or more circuits connected to the detector;
(b) providing a first party with the first device and a second party with second device; and
(c) providing a protocol, the protocol comprising:
  (i) establishing a secure connection or meeting between the first party and the second party;
  (ii) inputting or showing a same pattern or same sequence of patterns on each of the devices;
  (iii) recording one or more first keys in the first device and one or more second keys in the second device using the one or more patterns; and
  (iv) generating one or more key functions wherein each key function is a function of one of the first keys and one of the second keys generated by the same pattern, to form one or more key functions.

20. The method of claim 19, further comprising:
(iv) digitally saving the one or more patterns and the one or more key functions as one or more entries in a database, wherein each database entry comprises one of the key functions and the the pattern used to form the first key and the second key associated with the one of the key functions;
(v) the first party selecting one of the patterns and using the first device to recreate or reproduce the first key associated with the one or more patterns, to form a reproduced first key;
(vi) encrypting a message with the reproduced first key;
(vii) the first party sending the encrypted message and the one of the patterns used to obtain the reproduced first key;
(viii) the second party receiving the encrypted message and the one of the patterns;
(ix) the second party decrypting the encrypted message by
(1) using the one of the patterns to generate or reproduce the second key with the second device, to form a reproduced second key;
(2) obtaining the key function associated with the one or more patterns from the entry in the database corresponding to the one of the patterns, and
(3) operating on the encrypted message with the key function associated with one of the patterns and the second key.

21. A method of encrypting and/or decrypting, comprising:
(a) providing or obtaining two devices, the devices each comprising:
  a source of patterned Electromagnetic (EM) radiation, the patterned EM radiation having a patterned phase and/or a patterned amplitude according to one or more patterns inputted to the source of patterned EM radiation;
  a volumetric scattering medium connected to the source of patterned EM radiation, wherein:
    the volumetric scattering medium is positioned to receive and scatter the patterned EM radiation into keyed EM radiation; and
    upon receipt of the patterned EM radiation, the volumetric scattering medium modifies the patterned phase and the patterned amplitude of the patterned EM radiation to form the keyed EM radiation;
  a detector connected to the volumetric scattering medium, the detector positioned to detect an output speckle of the keyed EM radiation and comprising a circuit that produces a digital signal in response to the keyed EM radiation; and
  one or more processors and/or circuitry connected to the detector, for randomizing the digital signal to transform the output speckle into a digital key used to encrypt and/or decrypt;
providing a first party and a second party each with one of the devices; and
providing a protocol, the protocol comprising:
  (i) creating and storing a first party key comprising the digital key obtained using the first party's device;
  (ii) creating and storing a second party key comprising the digital key obtained using the second party's device;
  (iii) using a public key protocol to establish a secure connection between the first party and the second party;
  (iv) re-creating or reproducing the first party key using the first party's device to form a reproduced first party key and/or re-creating or reproducing the second party key using the second party's device to form a reproduced second party key, whenever is required by the public key protocol, wherein:
    the reproduced first party key has 0% error as compared to the first party key, and/or
    the reproduced second party key has 0% error as compared to the second party key.

22. One or more devices, the devices each comprising:
a source of patterned Electromagnetic (EM) radiation, the patterned EM radiation having a patterned phase and/or a patterned amplitude in response to, and according to, one or more patterns inputted to the source of patterned EM radiation;
a volumetric scattering medium connected to the source of patterned EM radiation, wherein:
  the volumetric scattering medium is positioned to receive and scatter the patterned EM radiation into keyed EM radiation, and
  the volumetric scattering medium can modify the patterned phase and/or the patterned amplitude of the patterned EM radiation to form the keyed EM radiation;
a detector connected to the volumetric scattering medium, the detector positioned to detect an output speckle of the keyed EM radiation and comprising circuitry that produces a digital signal in response to the keyed EM radiation; and
one or more processors connected to the detector, wherein the one or more processors can randomize the digital signal to transform the output speckle into a digital key used to encrypt and/or decrypt.

23. The one or more devices of claim 22, wherein the source of patterned EM radiation comprises pixels and/or a spatial light modulator (SLM) positioned to receive EM radiation from an EM radiation source, wherein the SLM and/or the pixels modify a phase and/or an amplitude of the EM radiation according to the one or more patterns to form the patterned EM radiation having the patterned phase and/or the patterned amplitude.

24. A system comprising the devices of claim 22, further comprising:
two of the devices, comprising a first device and a second device, wherein one or more first keys are produced in the first device and one or more second keys are produced in the second device, using the one or more patterns; and a computer connected to the devices and that can produce one or more key functions, wherein each key function is a function of one of the first keys and one of the second keys produced by the same pattern.

25. A method of fabricating a device, comprising:

positioning a volumetric scattering medium to receive patterned EM radiation from a source of patterned Electromagnetic (EM) radiation, wherein:
- the patterned EM radiation has a patterned phase and/or patterned amplitude according to, and in response to, one or more patterns inputted to the source of patterned EM radiation,
- the volumetric scattering medium is positioned to receive and scatter the patterned EM radiation into keyed EM radiation, and
- the volumetric scattering medium can modify the patterned phase and/or the patterned amplitude of the patterned EM radiation to form the keyed EM radiation;

positioning a detector to detect an output speckle of the keyed EM radiation, the detector comprising circuitry that produces a digital signal in response to the keyed EM radiation; and connecting one or more processors to the detector, wherein the one or more processors can randomize the digital signal to transform the output speckle into a digital key used to encrypt and/or decrypt.

\* \* \* \* \*